US012745279B2

(12) United States Patent
Faccin

(10) Patent No.: US 12,745,279 B2
(45) Date of Patent: Sep. 22, 2026

(54) UNMANNED AERIAL VEHICLE CATEGORY REPORTING

(71) Applicant: QUALCOMM Incorporated, San Diego, CA (US)

(72) Inventor: Stefano Faccin, San Ysidro, CA (US)

(73) Assignee: QUALCOMM Incorporated, San Diego, CA (US)

(*) Notice: Subject to any disclaimer, the term of this patent is extended or adjusted under 35 U.S.C. 154(b) by 14 days.

(21) Appl. No.: 17/226,670

(22) Filed: Apr. 9, 2021

(65) Prior Publication Data

US 2021/0392653 A1 Dec. 16, 2021

Related U.S. Application Data

(60) Provisional application No. 63/018,445, filed on Apr. 30, 2020.

(51) Int. Cl.
*H04L 9/32* (2006.01)
*B64U 101/00* (2023.01)
(Continued)

(52) U.S. Cl.
CPC ........... *H04W 72/56* (2023.01); *H04W 60/00* (2013.01)

(58) Field of Classification Search
CPC ........... H04L 2209/80; H04M 15/8016; G08G 5/0069; G08G 5/0039; G08G 1/205;
(Continued)

(56) References Cited

U.S. PATENT DOCUMENTS 9,658,619 B1 * 5/2017 Bethke ................. G05D 1/0061
2013/0281106 A1 * 10/2013 Lynch ................ H04B 7/18506 455/452.1

(Continued)

FOREIGN PATENT DOCUMENTS

CN 110574431 A 12/2019
CN 110838245 A 2/2020

(Continued)

OTHER PUBLICATIONS

International Search Report and Written Opinion—PCT/US2021/026841—ISA/EPO—Aug. 2, 2021.

(Continued)

*Primary Examiner* — Marcus Smith
*Assistant Examiner* — Jason A Harley
(74) *Attorney, Agent, or Firm* — QUALCOMM Incorporated

(57) ABSTRACT

Unmanned aerial vehicles (UAVs) usually have associated categories based on characteristics of the UAVs and characteristics of flights for the UAVs. These categories are provided to a UAV service supplier (USS) when the UAV registers with the USS and when the UAV submits flight plans to the USS for approval. Such categories are not provided to a wireless communication network that the UAV will use during flight. However, the wireless communication network cannot effectively prioritize service to some UAVs over other UAVs without these categories. Techniques and apparatuses described herein provide categories associated with UAVs to a mobile network that will provide service to the UAVs during flight. The categories may allow the mobile network to prioritize traffic to render operable UAVs that require low-latency communications, such as UAVs using autonomous navigation software, as well as reduce risk to UAVs engaged in high-risk or high-priority missions.

28 Claims, 14 Drawing Sheets

(51) Int. Cl.

| | |
|---|---|
| ***B64U 101/64*** | (2023.01) |
| ***G08G 5/32*** | (2025.01) |
| ***G08G 5/57*** | (2025.01) |
| ***H04W 12/06*** | (2021.01) |
| ***H04W 60/00*** | (2009.01) |
| ***H04W 72/56*** | (2023.01) |
| ***H04W 76/10*** | (2018.01) |
| ***H04W 76/11*** | (2018.01) |

(58) Field of Classification Search

CPC ....... G08G 5/0034; G08G 5/32; H04W 28/02; H04W 4/029; H04W 72/04; H04W 24/04; H04W 60/00; H04W 72/56; B64U 2101/00; B64U 80/82; B64U 2101/10; B64U 2201/00; G06F 21/31; H04B 17/27; H04B 7/18502; H04B 15/8016

USPC ............. 701/2, 22; 455/404.2, 431; 370/316

See application file for complete search history.

(56) References Cited

U.S. PATENT DOCUMENTS

2017/0015415 A1* 1/2017 Chan ...................... G06Q 30/04
2017/0195694 A1* 7/2017 Sham ................. H04B 7/18504
2018/0004207 A1* 1/2018 Michini ............... G08G 5/0069
2018/0004231 A1* 1/2018 Michini ............... G05D 1/0094
2018/0068567 A1* 3/2018 Gong .................... B64C 39/024
2018/0233055 A1 8/2018 Damnjanovic et al.
2019/0077508 A1* 3/2019 Shimezawa ........... H04W 24/10
2019/0116520 A1* 4/2019 Chaponniere ..... H04W 28/0268
2019/0197643 A1* 6/2019 Cochran .......... G06Q 10/06393
2019/0212724 A1* 7/2019 Phuyal .............. H04W 36/0061
2019/0313317 A1* 10/2019 Murphy ................. G06N 5/046
2020/0053554 A1* 2/2020 Kim ...................... H04W 60/00
2020/0266903 A1* 8/2020 De Rosa ............ H04B 7/18506
2020/0310408 A1* 10/2020 Carper ................. G08G 5/0039
2020/0336901 A1* 10/2020 Zhu ....................... H04W 12/61
2021/0101679 A1* 4/2021 Han ....................... G05D 1/101
2021/0160680 A1* 5/2021 Velev ...................... H04W 4/20
2022/0052839 A1* 2/2022 Ali .......................... G08G 5/26

FOREIGN PATENT DOCUMENTS

CN 110868712 A 3/2020
EP 3422038 A1 1/2019
WO 2020033905 A1 2/2020

OTHER PUBLICATIONS

Qualcomm Incorporated: “Quality Improvement of TR22.829 ( FS_EAV)”, 3GPP TSG-SA WG1 Meeting #86, 3GPP Draft; S1-191548, 3rd Generation Partnership Project (3GPP), Mobile Competence Centre, 650, Route Des Lucioles, F-06921 Sophia-Antipolis Cedex, France, SA WG1. No. Suzhou. China; May 6, 2019-May 10, 2019, May 13, 2019 (May 13, 2019), 31 Pages, XP051743712, Retrieved from the Internet: URL: https://www.3gpp.org/FTP/TSG_SA/WG1_Serv/TSGS1_86_Suzhou/Docs/S1-191548.zip [retrieved on May 13, 2019], paragraph [5. 3. 2]—paragraph [5.3.6].

Intel: “Resolving EN for Use Case of C2 Communication”, 3GPP TSG-SA WG1 Meeting #85, S1-190124, Tallin, Estonia, Feb. 18-22, 2019, 5 Pages.

* cited by examiner 200
294
Comm Unit
290
Controller/ Processor
292
Memory
130
110
212
Data Source
220
Transmit Processor
230
TX MIMO Processor
232a
MOD
DEMOD
234a
244
Comm Unit
242
Memory
240
Controller/ Processor
246
Scheduler
239
Data Sink
238
Receive Processor
236
MIMO Detector
232t
MOD
DEMOD
234t
252a
254a
DEMOD
MOD
256
MIMO Detector
258
Receive Processor
260
Data Sink
120
280
Controller/ Processor
282
Memory
252r
254r
DEMOD
MOD
266
TX MIMO Processor
264
Transmit Processor
262
Data Source

600

800

UNMANNED AERIAL VEHICLE CATEGORY REPORTING

CROSS-REFERENCE TO RELATED APPLICATION

This patent application claims priority to U.S. Provisional Patent Application No. 63/018,445, filed on Apr. 30, 2020, entitled "UNMANNED AERIAL VEHICLE CATEGORY REPORTING," and assigned to the assignee hereof. The disclosure of the prior Application is considered part of and is incorporated by reference into this patent application.

BACKGROUND

Field

Aspects of the present disclosure generally relate to wireless communication and to techniques and apparatuses for category reporting of unmanned aerial vehicles (UAVs).

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

Unmanned aerial vehicles (UAVs) often have one or more associated categories based at least in part on characteristics of the UAVs. For example, UAVs may be categorized by flight control type (e.g., an integer or class associated with manual control, semi-automatic control, automatic control, semi-autonomous control, autonomous control, and/or the like), spatial size, weight, battery life, operating power, and/or the like. Additionally, or alternatively, UAVs may have one or more categories based at least in part on characteristics of flights for the UAVs. For example, UAVs may be categorized by flight type (e.g., class A, B, or C as defined by the European Union Aviation Safety Agency, and/or the like), mission priority (e.g., life-saving, passenger transport, goods delivery, surveillance, and/or the like), area of operation (e.g., rural, suburban, urban, and/or the like), and/or the like. UAVs may provide these categories to a UAV supplier service during registration of the UAVs with the USS and/or when submitting flight plans to the USS for approval. The categories are generally not provided to a wireless communication network that the UAVs will use during flight. However, the wireless communication network cannot effectively prioritize service to some UAVs over other UAVs if the wireless communication network is unaware of the associated categories. For example, the inability to prioritize effectively may result in undue risk to any UAVs performing life-saving missions, carrying passengers, and/or engaged in other risk-sensitive flights. In addition, the inability to prioritize effectively may render some UAVs inoperable, such as any UAVs that rely on low-latency communications from autonomous navigation software.

Some techniques and apparatuses described herein provide categories associated with UAVs to a mobile network that will provide service to the UAVs during flight. For example, techniques and apparatuses described herein may permit the UAVs to provide categories to the mobile network during registration (and/or subscription) of the UAVs to the mobile network and/or before operating using an approved flight plan. The categories provided by the techniques and apparatuses described herein may allow the mobile network to prioritize traffic effectively to some UAVs over other UAVs. For example, the mobile network may prioritize resources such that any UAVs that require low-latency communications, such as any UAVs using autonomous navigation software, are rendered operable on the mobile network. Additionally, or alternatively, the mobile network may prioritize resources such that any UAVs operating life-saving missions, carrying passengers, and/or engaging in other high-risk flights are not subjected to undue levels of risk caused by high-latency communications on the mobile network.

In an aspect of the disclosure, a method, an unmanned aerial vehicle (UAV), a network node, a network device, an apparatus, and a computer program product are provided.

In some aspects, the method may be performed by a UAV. The method may include transmitting a communication associated with a registration of the UAV with a mobile network; and providing one or more initial categories associated with the UAV for association with the registration.

In some aspects, the UAV may include a memory and one or more processors operatively coupled to the memory. The memory and the one or more processors may be configured to transmit a communication associated with a registration of the UAV with a mobile network; and provide one or more initial categories associated with the UAV for association with the registration.

In some aspects, the apparatus may include means for transmitting a communication associated with a registration of a UAV with a mobile network; and means for providing one or more initial categories associated with the UAV for association with the registration.

In some aspects, the computer program product may include a non-transitory computer-readable medium storing one or more instructions. The one or more instructions, when executed by one or more processors of a UAV, may cause the one or more processors to transmit a communication associated with a registration of the UAV with a mobile network; and provide one or more initial categories associated with the UAV for association with the registration.

In some aspects, the method may be performed by a network node. The method may include receiving one or more categories associated with a UAV; and prioritizing, based at least in part on the one or more categories, one or more resources served by a network that includes the network node.

In some aspects, the network node may include a memory and one or more processors operatively coupled to the memory. The memory and the one or more processors may be configured to receive one or more categories associated with a UAV; and prioritize, based at least in part on the one or more categories, one or more resources served by a network that includes the network node.

In some aspects, the apparatus may include means for receiving one or more categories associated with a UAV; and means for prioritizing, based at least in part on the one or more categories, one or more resources served by a network that includes the network node.

In some aspects, the computer program product may include a non-transitory computer-readable medium storing one or more instructions. The one or more instructions, when executed by one or more processors of a network node, may cause the one or more processors to receive one or more categories associated with a UAV; and prioritize, based at least in part on the one or more categories, one or more resources served by a network that includes the network node.

In some aspects, the method may be performed by a network device. The method may include receiving one or more categories associated with a UAV; and transmitting the one or more categories to one or more network nodes in communication with the UAV.

In some aspects, the network device may include a memory and one or more processors operatively coupled to the memory. The memory and the one or more processors may be configured to receive one or more categories associated with a UAV; and transmit the one or more categories to one or more network nodes in communication with the UAV.

In some aspects, the apparatus may include means for receiving one or more categories associated with a UAV; and means for transmitting the one or more categories to one or more network nodes in communication with the UAV.

In some aspects, the computer program product may include a non-transitory computer-readable medium storing one or more instructions. The one or more instructions, when executed by one or more processors of a network device, may cause the one or more processors to receive one or more categories associated with a UAV; and transmit the one or more categories to one or more network nodes in communication with the UAV.

Aspects generally include a method, apparatus, system, computer program product, non-transitory computer-readable medium, user equipment, base station, unmanned aerial vehicle, network node, network device, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
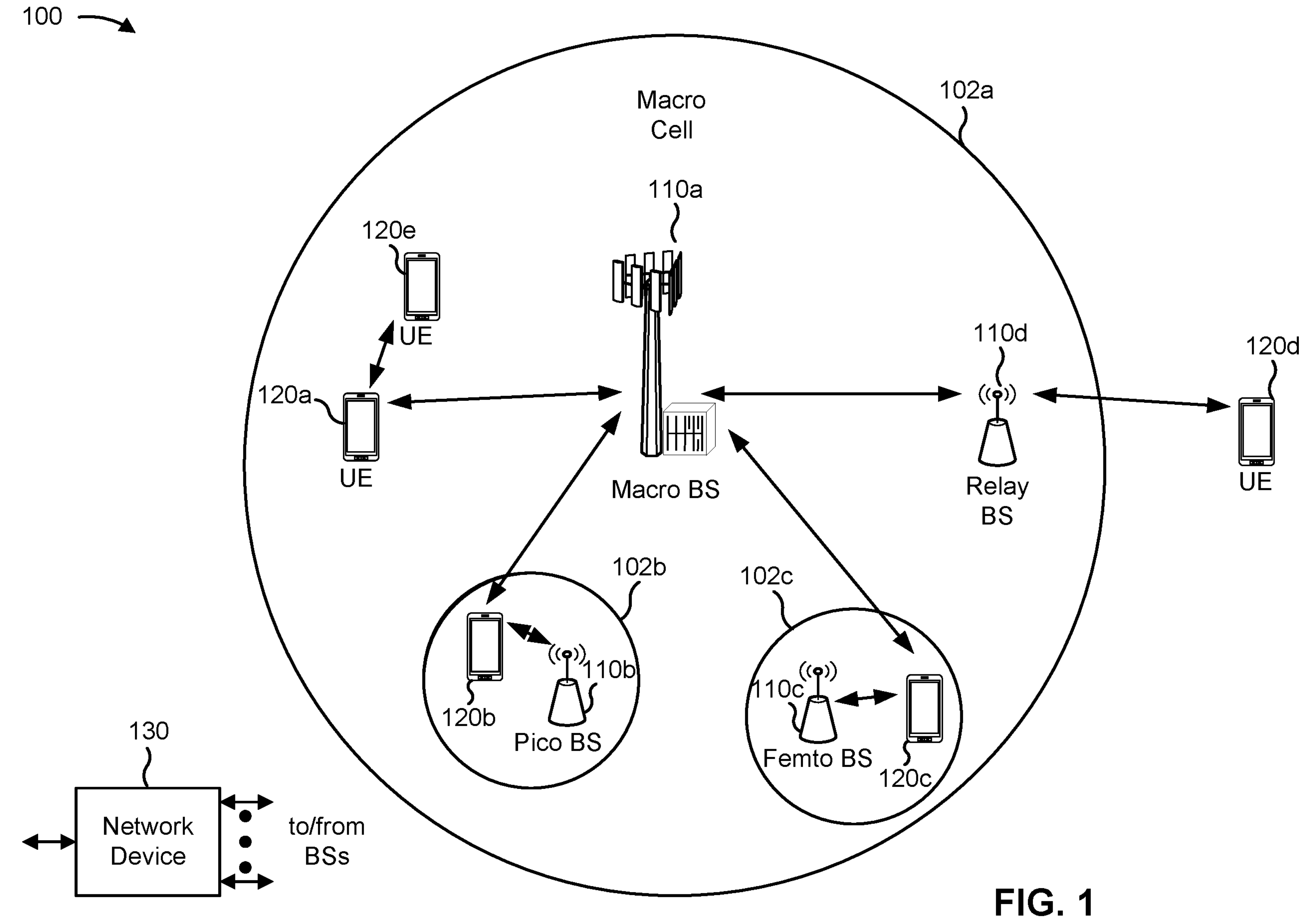
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communication between BS 110*a* and UE 120*d*. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network device 130 may couple to a set of BSs and may provide coordination and control for these BSs. Network device 130 may communicate with the BSs via a backhaul. For example, network device 130 may form part of a core network that enables communications between the BSs and one or more devices and/or networks connected to the core network. In some aspects, network device 130 can include one or more mobility management entities (MMEs) and/or access and mobility management functions (AMFs), one or more network exposure functions (NEFs) and/or service capability exposure function (SCEFs), one or more session management functions (SMFs), one or more policy control functions (PCFs), and/or other entities and/or functions that provide mobility functions for the UEs 120. The BSs may also communicate with one another, e.g., directly or indirectly via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, an unmanned aerial vehicle (UAV), or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources. When the resources within the wireless communication network are constrained based on a number of UEs using the network and/or loads required by the UEs using the network, the wireless communication network may prioritize service to one or more UEs over service to one or more other UEs. The scheduling entity may apply prioritization rules to maintain quality and/or reliability of service to UEs that are assigned higher quality of service (QoS) indicators at the expense of UEs that are assigned lower QoS indicators. This may be useful when the UEs correspond to unmanned aerial vehicles (UAVs).

As indicated above, FIG. 1 is provided as an example. Other examples may differ from what is described with regard to FIG. 1.

Figure 2:
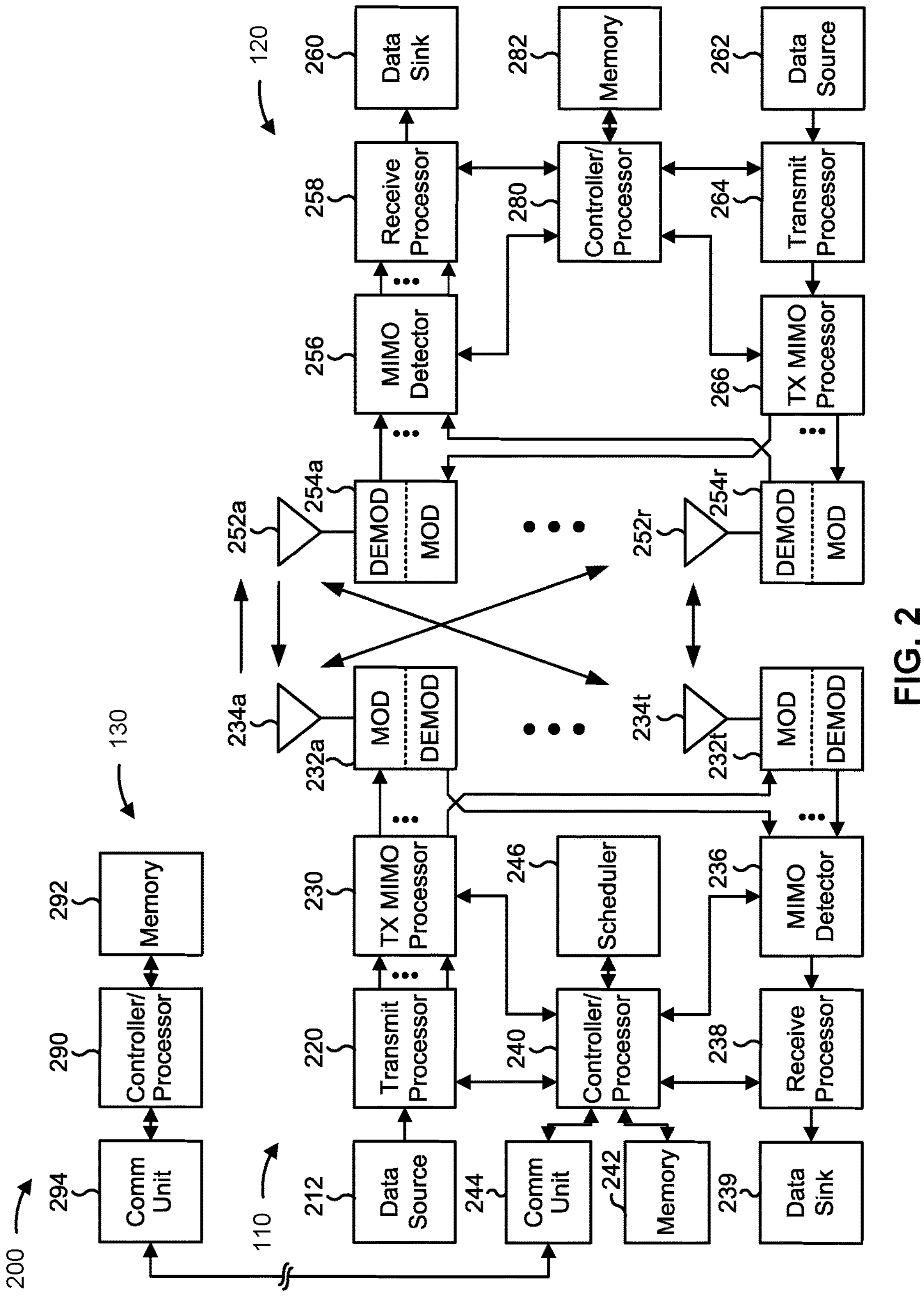
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234*a* through 234*t*, and UE 120 may be equipped with R antennas 252*a* through 252*r*, where in general $T \geq 1$ and $R \geq 1$.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine RSRP, RSSI, RSRQ, CQI, and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network device 130 via communication unit 244. Network device 130 may include communication unit 294, controller/processor 290, and memory 292.

Controller/processor 240 of base station 110, controller/processor 280 of UE 120, controller/processor 290 of network device(s) 130, and/or any other component(s) of FIG. 2 may perform one or more techniques associated with category reporting for unmanned aerial vehicles, as described in more detail elsewhere herein. For example, controller/processor 240 of base station 110, controller/processor 280 of UE 120, controller/processor 290 of network device(s) 130, and/or any other component(s) of FIG. 2 may perform or direct operations of, for example, method 600 of FIG. 6, method 700 of FIG. 7, method 800 of FIG. 8, and/or other processes as described herein. Memories 242, 282, and 292 may store data and program codes for BS 110, UE 120, and network device(s) 130, respectively. A scheduler 246 may schedule UEs for data transmission on the downlink and/or uplink.

As indicated above, FIG. 2 is provided as an example. Other examples may differ from what is described with regard to FIG. 2.

Figure 3:
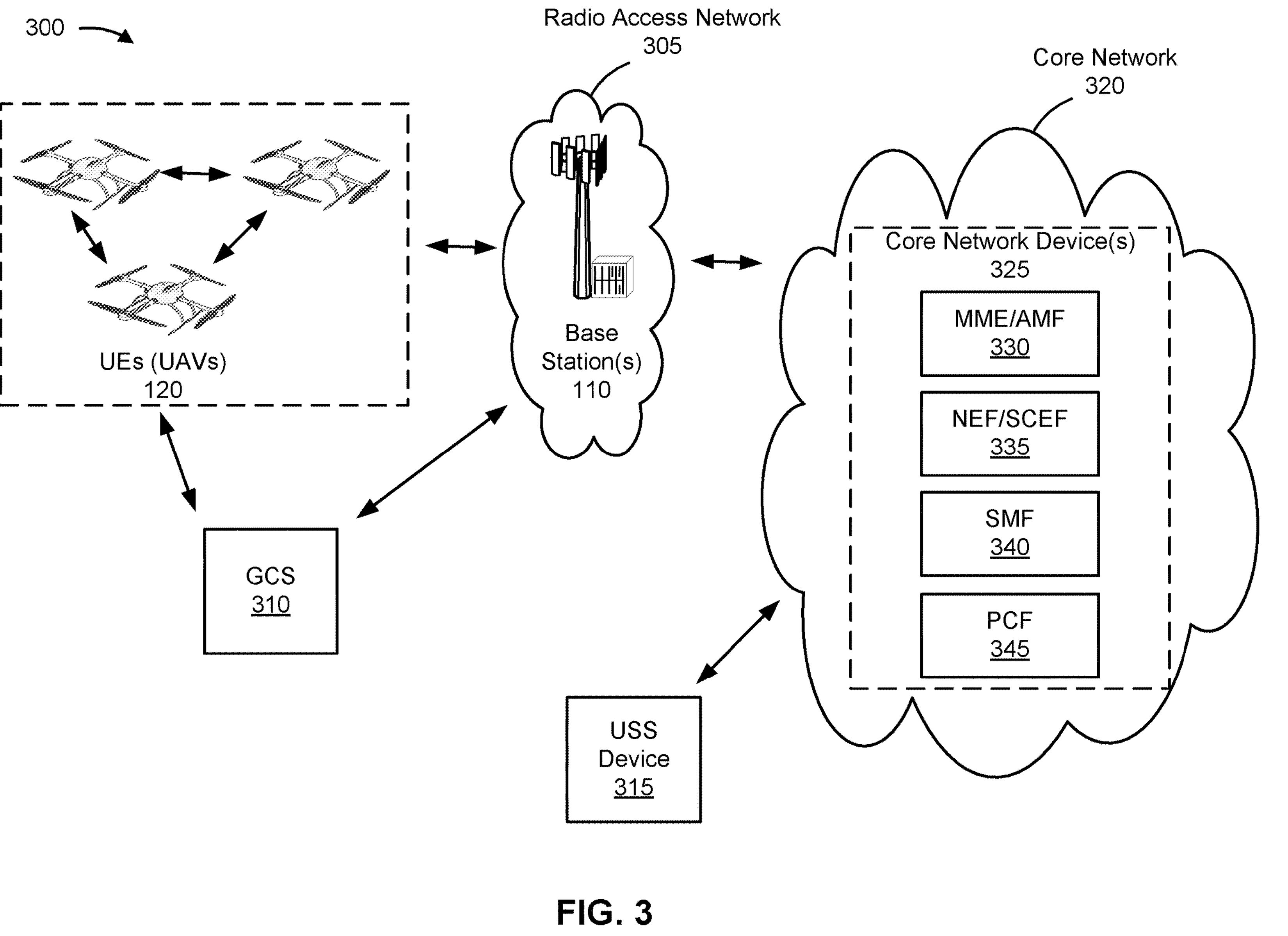
FIG. 3 is a diagram illustrating an example of unmanned aerial vehicles (UAVs) within a wireless communication network.

FIG. 3 is a diagram illustrating an example of UAVs 120 within a wireless communication network environment 300. As shown in FIG. 3, the environment 300 can include one or more UEs 120, which may include one or more UAVs 120, a radio access network (RAN) 305, a core network 320, a UAV supplier service (USS) device 315, and a ground control system (GCS) 310. Devices of environment 300 can interconnect via wired connections, wireless connections, or a combination of wired and wireless connections.

The UAV 120 includes an aircraft without a human pilot aboard and can also be referred to as an unmanned aircraft (UA), a drone, a remotely piloted vehicle (RPV), a remotely piloted aircraft (RPA), or a remotely operated aircraft (ROA). The UAV 120 can have a variety of shapes, sizes, configurations, characteristics, and/or the like for a variety of purposes and applications. In some implementations, the UAV 120 can include one or more sensors, such as an electromagnetic spectrum sensor (e.g., a visual spectrum, infrared, or near infrared camera, a radar system, and/or the like), a biological sensor, a temperature sensor, a chemical sensor, and/or the like. In some implementations, the UAV 120 can include one or more components for communicating with one or more base stations 110. Additionally, or alternatively, the UAV 120 can transmit information to and/or can receive information from the GCS 310, such as sensor data, flight plan information, and/or the like. Such information can be communicated directly (e.g., via an RRC signal and/or the like) and/or via the base stations 110 on the RAN 305.

The RAN 305 includes one or more radio access networks such as, for example, a code division multiple access (CDMA) RAN, a time division multiple access (TDMA) RAN, a frequency division multiple access (FDMA) RAN, a universal terrestrial radio access network (UTRAN), an evolved UTRAN (E-UTRAN) (e.g., a long-term evolution (LTE) RAN, an LTE-Advanced (LTE-A) RAN, an LTE-unlicensed (LTE-U) RAN, and/or the like), and/or the like. The RAN 305 can include one or more base stations 110 that provide access for the UAVs 120 to the core network 320.

Base station 110 includes one or more devices capable of transferring traffic, such as audio, video, text, and/or other traffic, destined for and/or received from the UAV 120. In some implementations, the base station 110 can include an evolved NodeB (eNB) associated with an LTE RAN that receives traffic from and/or sends traffic to the GCS 310 and/or a USS device 315 via the core network 320. Additionally, or alternatively, one or more base stations 110 can be associated with a RAN that is not associated with the LTE network.

The base station 110 can send traffic to and/or receive traffic from the UAV 120 via an air interface. The base stations 110 can include different types of base stations, such as a macro cell base station or a small cell base station (e.g., a micro cell base station, a pico cell base station, and/or a femto cell base station). A macro cell base station can cover a relatively large geographic area (e.g., several kilometers in radius). A small cell base station can be a lower-powered base station, as compared with a macro cell base station, that can operate in the same or different (e.g., licensed, unlicensed, etc.) frequency bands as macro cell base stations.

The GCS 310 includes one or more devices capable of managing the UAVs 120 and/or flight plans for the UAVs 120. For example, the GCS 310 can include a server device, a desktop computer, a laptop computer, or a similar device.

In some implementations, the GCS 310 can communicate with one or more devices of the environment 300 (e.g., the UAV 120, the USS device 315, and/or the like) to receive information regarding flight plans for the UAVs 120 and/or to provide recommendations associated with such flight plans, as described elsewhere herein. In some implementations, the GCS 310 can permit a user to control the UAVs 120. Additionally, or alternatively, the GCS 310 can use a neural network and/or other artificial intelligence (AI) to control the UAVs 120. In some implementations, the GCS 310 can be included in a data center, a cloud computing environment, a server farm, and/or the like, which can include multiple GCSs 310. While shown as being external from the core network 320, in some aspects, the GCS 310 can reside at least partially within the core network 320.

The USS device 315 includes one or more devices capable of receiving, storing, processing, and/or providing information associated with the UAVs 120 and/or the GCS 310. For example, the USS device 315 can include a desktop computer, a laptop computer, a tablet computer, a mobile phone, or a similar device. In some implementations, the UAVs 120 can interact with the USS device 315 to register a flight plan; receive approval, analysis, and/or recommendation related to a flight plan; and/or the like.

The core network 320 includes a network that enables communications between the RAN 305 (e.g., the base stations 110) and one or more devices and/or networks connected to the core network 320. For example, the core network 320 can include an evolved packet core (EPC). The core network 320 can include one or more core network devices 325, such as one or more mobility management entities (MMEs) and/or access and mobility management functions (AMFs) (herein after referred to as a "MME/AMF") 330, one or more network exposure functions (NEFs) and/or service capability exposure function (SCEFs) (herein after referred to as a "NEF/SCEF") 335, one or more session management functions (SMFs) (herein after referred to as an "SMF") 340, one or more policy control functions (PCFs) (herein after referred to as a "PCF") 345, and/or other entities and/or functions that provide mobility functions for the UAVs 120 and enable the UAVs 120 to communicate with other devices of the environment 300.

The MME/AMF 330 includes one or more network devices, such as one or more server devices, capable of managing authentication, activation, deactivation, and/or mobility functions associated with the UAV 120 connected to the core network 320. In some implementations, the MME/AMF 330 may perform operations relating to authentication of the UAV 120. The MME/AMF 330 may perform operations associated with handing off the UAV 120 from a first base station 110 to a second base station 110 when the UAV 120 is transitioning from a first cell associated with the first base station 110 to a second cell associated with the second base station 110. Additionally, or alternatively, the MME/AMF 330 may select another MME and/or AMF (not pictured), to which the UAV 120 should be handed off (e.g., when the UAV 120 moves out of range of the MME/AMF 330). In some implementations, the MME/AMF 330 may communicate with the UAV 120 (e.g., via the base station 110) to obtain information concerning a location of the UAV 120 and/or a reachability of the UAV 120 and may send the information to the NEF/SCEF 335.

The NEF/SCEF 335 includes one or more network exposure devices, such as one or more server devices, capable of exposing capabilities, events, information, and/or the like in one or more wireless networks to help other devices in the one or more wireless networks discover network services and/or utilize network resources efficiently. In some implementations, the NEF/SCEF 335 may include an NEF associated with a 5G network and/or a SCEF associated with an LTE network that receives traffic from and/or sends traffic to the UAV 120 via the MME/AMF 330 and the base station 110, and that receives traffic from and/or sends traffic to the USS device 315. In some implementations, the NEF/SCEF 335 may obtain a data structure, such as approval of a flight plan for the UAV 120, from the USS device 315 and divide the data structure into a plurality of data segments. In some implementations, the NEF/SCEF 335 may determine a location and/or reachability of the UAV 120 and/or a communication capability of the base station 110 to determine how to send the plurality of data segments to the UAV 120.

The SMF 340 includes one or more network devices, such as one or more server devices, capable of managing sessions for the RAN 305 and allocates addresses, such as Internet protocol (IP) addresses, to the UAVs 120. In some implementations, the SMF 340 may perform operations relating to registration of the UAV 120. For example, the MME/AMF 330 may receive a registration request from the UAV 120 and forward a request to the SMF 340 to create a corresponding packet data unit (PDU) session. The SMF 340 may allocate an address to the UAV 120 and establish the PDU session for the MME/AMF 330.

The PCF 345 includes one or more network devices, such as one or more server devices, capable of managing traffic to and from the UAVs 120 through the RAN 305 and enforcing a quality of service (QoS) on the RAN 305. In some implementations, the PCF 345 may implement charging rules and flow control rules, manage traffic priority, and/or manage a QoS for the UAVs 120. For example, as described below in connection with FIG. 5, the PCF 345 may map categories associated with the UAVs 120 to QoS indicators such that the RAN 305 provides service to the UAVs 120 commensurate with the QoS indicators.

One or more of core network device(s) 325 may correspond to network device 130, as described above in connection with FIG. 1. The USS device 315 may communicate with core network 320 using one or more interfaces, such as a UAV flight management system (UFMS). For example, the USS device 315 may provide, via the UFMS, categories associated with the UAV 120 to the NEF/SCEF 335 for delivery to the base station 110, as described below in connection with FIG. 5. Additionally, or alternatively, the USS device 315 may receive, using the UFMS and from the NEF/SCEF 335, an indication of the MME/AMF 330 currently serving the UAV 120 and may deliver, to the indicated MME/AMF 330, categories associated with the UAV 120 for delivery to the base station 110, as described below in connection with FIG. 5. Additionally, or alternatively, the USS device 315 may provide, via the UFMS, categories associated with the UAV 120 to the PCF 345 for processing, as described below in connection with FIG. 5. The UFMS may be external from the GCS 310 or may, at least in part, reside at least partially within the GCS 310.

As indicated above, FIG. 3 is provided as an example. Other examples may differ from what is described with respect to FIG. 3.

UAVs may have one or more associated categories based at least in part on characteristics of the UAVs. For example, the UAVs may be categorized by flight control type (e.g., an integer or class associated with manual control, semi-automatic control, automatic control, semi-autonomous control, autonomous control, and/or the like), spatial size, weight, battery life, operating power, and/or the like. Additionally, or alternatively, the UAVs may have one or more categories based at least in part on characteristics of flights for the UAVs. For example, the UAVs may be categorized by flight type (e.g., class A, B, or C as defined by the European Union Aviation Safety Agency, and/or the like), mission priority (e.g., life-saving, passenger transport, goods delivery, surveillance, and/or the like), area of operation (e.g., rural, suburban, urban, and/or the like), and/or the like.

UAVs may provide initial categories, such as categories tied to characteristics of the UAVs and/or default categories for expected flights of the UAVs, to a USS during registration of the UAVs with the USS. Additionally, the UAVs may provide updated categories when submitting flight plans to the USS for approval. For example, the updated categories may be associated with characteristics of the flight plans submitted for approval.

Such categories are generally not provided to a wireless communication network that the UAVs will use during flight. However, the wireless communication network cannot prioritize service to some UAVs over other UAVs if the wireless communication network is unaware of categories associated with the UAVs. The inability to prioritize based on the categories associated with the UAVs may result in undue risk to those of the UAVs performing life-saving missions, carrying passengers, and/or engaged in other risk-sensitive flights. In addition, the inability to prioritize based on the categories associated with the UAVs may render some of the UAVs inoperable, such as those UAVs that rely on low-latency communications from autonomous software operated at least in part by a GCS.

Some techniques and apparatuses described herein in connection with FIGS. 4-14 provide categories associated with the UAVs 120 to network nodes (e.g., base stations 110) that will provide service to the UAVs 120 during flight. For example, techniques and apparatuses described herein may permit the UAVs 120 to provide initial categories to a mobile network including the base stations 110 during registration (and/or subscription) of the UAVs 120 to the mobile network and/or to provide updated categories to the mobile network including the base stations 110 before operating. Additionally, or alternatively, techniques and apparatuses described herein may permit the base stations 110 to receive initial categories and/or updated categories from the USS device 315.

The categories provided by the techniques and apparatuses described herein may allow network nodes (e.g., base stations 110) to prioritize traffic to some of the UAVs 120 over other of the UAVs 120. For example, the base stations 110 may prioritize resources such that any UAVs that require low-latency communications, such as any UAVs using autonomous software operated at least in part by the GCS 310, are rendered operable on a mobile network including the base stations 110. Additionally, or alternatively, the base stations 110 may prioritize resources such that any UAVs operating life-saving missions, carrying passengers, and/or engaging in other high-risk flights are not subjected to undue levels of risk caused by high-latency communications on the mobile network including the base stations 110.

Figure 4:
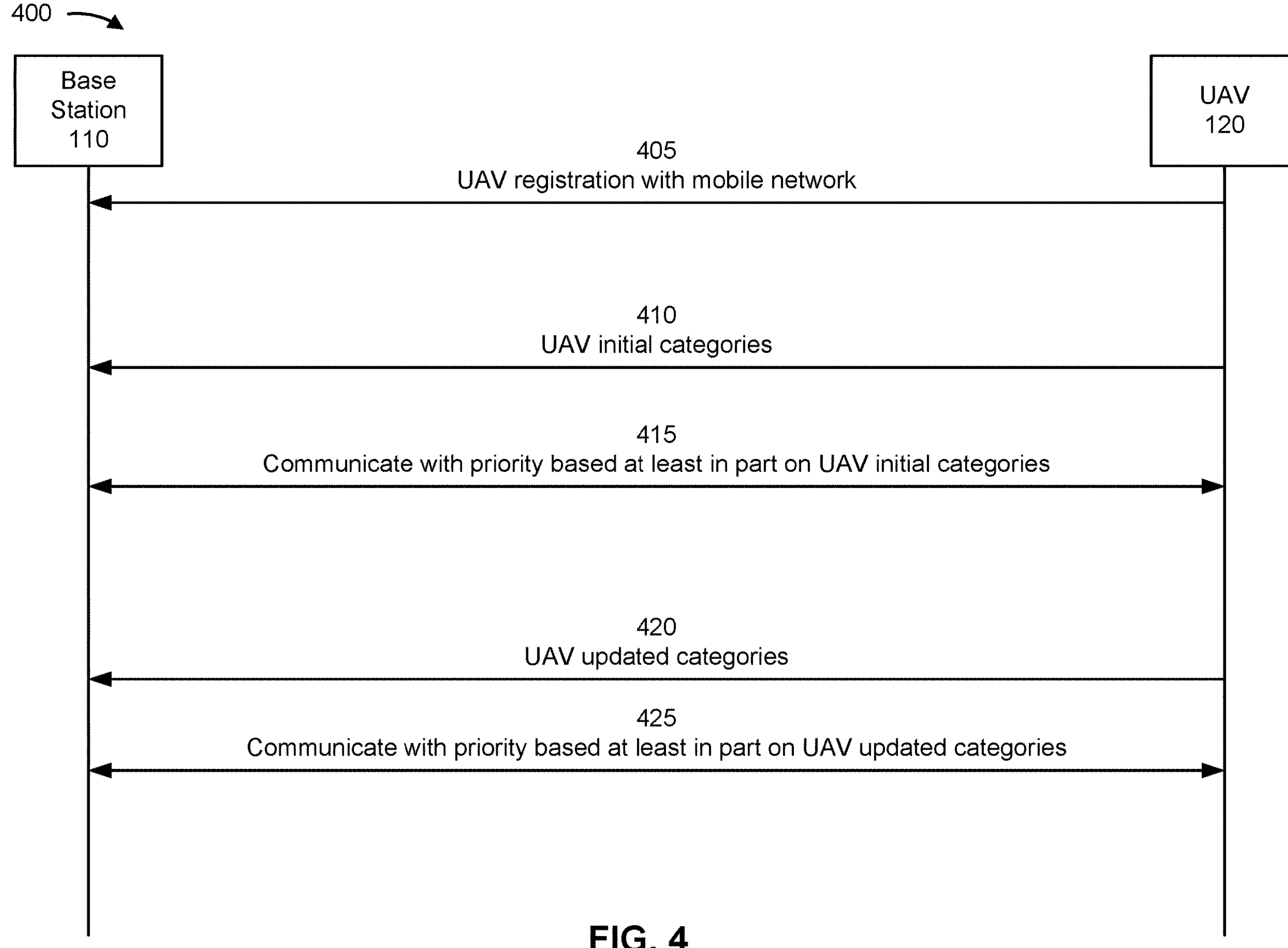
FIG. 4 is a diagram illustrating an example of provisioning UAV categories to a mobile network.

FIG. 4 is a diagram illustrating an example 400 of provisioning UAV categories to a mobile network, in accordance with the present disclosure. As shown in FIG. 4, the UAV 120 may communicate with one or more network nodes (e.g., one or more base stations 110) on a mobile network (e.g., a 5G network, an LTE network, and/or the like). In the example shown in FIG. 4, the UAV 120 communicates with base station 110 on the mobile network, e.g., using RRC signaling and/or the like. However, the description below applies equally to the UAV 120 communicating with a portion (e.g., network device(s) 130) of a core network supporting the base station 110, such as an MME/AMF and/or the like, e.g., using non-access stratum (NAS) signaling and/or the like.

At 405, the UAV 120 may transmit a communication associated with a registration of the UAV 120 with a mobile network. As shown in FIG. 4, the UAV 120 may transmit the communication to the base station 110, e.g., via an RRC connection and/or the like. Additionally, or alternatively, the UAV 120 may transmit the communication to an MME/AMF of the core network supporting the base station 110, e.g., using NAS signaling and/or the like.

At 410, the UAV 120 may provide one or more initial categories associated with the UAV for association with the registration. As shown in FIG. 4, the UAV 120 transmits the one or more initial categories to the base station 110, e.g., via an RRC connection and/or the like. Additionally, or alternatively, the UAV 120 may provide the one or more initial categories to the mobile network including the base station 110 via an MME/AMF of the mobile network, e.g., using NAS signaling and/or the like.

Additionally, or alternatively, as described below in connection with FIG. 5, the UAV 120 may provide the one or more initial categories to USS device 315 to permit the USS device 315 to supply the one or more initial categories to the mobile network including the base station 110. For example, the USS device 315 may transmit the one or more initial categories, e.g., using NAS signaling and/or the like, to an NEF/SCEF of the core network supporting the base station 110 for delivery to the AMF serving the base station 110. Additionally, or alternatively, the USS device 315 may transmit the one or more initial categories, e.g., using NAS signaling and/or the like, to an SMF of the core network supporting the base station 110 and establishing a PDU session with the UAV 120, for delivery to the AMF serving the base station 110. Additionally, or alternatively, the NEF/SCEF of the core network supporting the base station 110 may indicate, to the USS device 315, an identification of which AMF is serving the base station 110 with which the UAV 120 is communicating. The USS device 315 may transmit the one or more initial categories to that AMF based at least in part on the identification.

In some aspects, the one or more initial categories may include at least one of a flight control type category, a flight category, a mission category, an area of operation category, or a combination thereof. For example, as described above in connection with FIG. 3, the one or more initial categories may indicate a level of flight control (e.g., manual, semi-automatic, automatic, semi-autonomous, autonomous, and/or the like), a size of the UAV 120, a weight of the UAV 120, a battery life of the UAV 120, an operating power of the UAV 120, and/or the like. Additionally, or alternatively, the one or more initial categories may indicate default characteristics about expected flights of the UAV 120, such as a flight category for the expected flights (e.g., class A, B, or C as defined by the European Union Aviation Safety Agency and/or the like), a mission priority for the expected flights (e.g., life-saving, passenger transport, goods delivery, surveillance, and/or the like), an area of operation for the expected flights (e.g., rural, suburban, urban, and/or the like), and/or the like.

In the example of FIG. 4, the communication associated with the registration of the UAV 120 with the mobile network including the base station 110 is separate from a communication including the one or more initial categories. In some aspects, the communication associated with the registration of the UAV 120 with the mobile network including the base station 110 may include an indicator (e.g., an identifier of the UAV 120) that triggers the mobile network to obtain the one or more initial categories. For example, the base station 110 may obtain the one or more initial categories from an AMF serving the base station 110. The AMF may obtain the one or more initial categories from the UAV 120, the USS device 315, the SMF of the core network managing a current PDU session with the UAV 120, the NEF/SCEF of the core network, and/or the like.

In some aspects, the UAV 120 may include the one or more initial categories with the communication associated with the registration of the UAV 120 with the mobile network. Additionally, or alternatively, the UAV 120 may include the one or more initial categories with a communication associated with the subscription of the UAV 120 with the mobile network. When the UAV 120 transmits the communication associated with the registration of the UAV 120 with the mobile network (e.g., to the base station 110), the communication may include an indicator (e.g., an identifier of the UAV 120) that triggers the mobile network to obtain the one or more initial categories. For example, the base station 110 may obtain the one or more initial categories from an AMF serving the base station 110. The AMF may have stored the one or more initial categories after receiving the one or more initial categories from the UAV 120 during subscription of the UAV 120 to the mobile network.

At 415, the base station 110 may prioritize, based at least in part on the one or more initial categories, one or more resources served by the mobile network that includes the base station 110. For example, the base station 110 may determine a QoS to provide to the UAV 120 based at least in part on the one or more initial categories. While the description to follow will describe prioritization using QoS, the description equally applies to other techniques for prioritizing network traffic to achieve a desired measure of quality and/or reliability. The base station 110 may use a table, a formula, or another data structure or function that converts the one or more initial categories into a measure of QoS. Additionally, or alternatively, the base station 110 may receive a QoS indicator from a PCF of the core network supporting the base station 110 based at least in part on the one or more initial categories. Additionally, or alternatively, an SMF of the core network may receive the QoS indicator from the PCF and use the QoS indicator in a PDU session with the base station 110 (e.g., by providing the QoS indicator to a user plane function (UPF) with corresponding traffic filters and/or to the UAV 120, e.g., via NAS signaling, such that the UAV 120 uses the QoS indicator when communicating with the mobile network).

At 420, the UAV 120 may transmit one or more updated categories that are based at least in part on a flight plan of the UAV 120. As shown in FIG. 4, the UAV 120 may transmit the one or more updated categories to the base station 110, e.g., using an RRC connection and/or the like. Additionally, or alternatively, the UAV 120 may provide the one or more updated categories to the mobile network including the base station 110 via an MME/AMF of the mobile network, e.g., using NAS signaling and/or the like.

Additionally, or alternatively, as described below in connection with FIG. 5, the UAV 120 may provide the one or more updated categories to USS device 315 to permit the USS device 315 to supply the one or more updated categories to the mobile network including the base station 110. For example, the USS device 315 may transmit the one or more updated categories, e.g., using NAS signaling and/or the like, to an NEF/SCEF of the core network supporting the base station 110, for delivery to the AMF serving the base station 110. Additionally, or alternatively, the NEF/SCEF of the core network supporting the base station 110 may indicate, to the USS device 315, an identification of which AMF is serving the base station 110 with which the UAV 120 is communicating. The USS device 315 may transmit the one or more updated categories to that AMF based at least in part on the identification.

Similar to the one or more initial categories described above, the one or more updated categories may include at least one of a flight control type category, a flight category, a mission category, an area of operation category, or a combination thereof. For example, as described above in connection with FIG. 3, the one or more updated categories may indicate a level of flight control (e.g., manual, semi-automatic, automatic, semi-autonomous, autonomous, and/or the like), a size of the UAV 120, a weight of the UAV 120, a battery life of the UAV 120, an operating power of the UAV 120, and/or the like. Additionally, or alternatively, the one or more updated categories may indicate default characteristics about expected flights of the UAV 120, such as flight category for the expected flights (e.g., class A, B, or C as defined by the European Union Aviation Safety Agency and/or the like), mission priority for the expected flights (e.g., life-saving, passenger transport, goods delivery, surveillance, and/or the like), area of operation for the expected flights (e.g., rural, suburban, urban, and/or the like), and/or the like.

At 425, the base station 110 may prioritize, based at least in part on the one or more updated categories, one or more resources served by the mobile network that includes the base station 110. For example, as described above, the base station 110 may determine an updated QoS to provide to the UAV 120 based at least in part on the one or more updated categories. Additionally, or alternatively, as described above, the base station 110 may receive an updated QoS indicator from a PCF of the core network supporting the base station 110 based at least in part on the one or more updated categories. Additionally, or alternatively, an SMF of the core network may receive the updated QoS indicator from the PCF and use the updated QoS indicator in a PDU session with the base station 110 (e.g., by providing the QoS indicator to a UPF with corresponding traffic filters and/or to the UAV 120, e.g., via NAS signaling, such that the UAV 120 uses the QoS indicator when communicating with the mobile network).

Accordingly, the base station 110 may modify a QoS provided to the UAV 120 based at least in part on a flight plan of the UAV 120. For example, the base station 110 may raise a QoS provided to the UAV 120 when the one or more updated categories indicate that the UAV 120 is using more automation and/or undertaking a life-saving mission on this flight plan. In another example, the base station 110 may lower a QoS provided to the UAV 120 when the one or more updated categories indicate that the UAV 120 is using less automation and/or undertaking a low-risk mission (e.g., delivery of goods) on this flight plan.

As indicated above, FIG. 4 is provided as an example. Other examples may differ from what is described with respect to FIG. 4.

Figure 5:
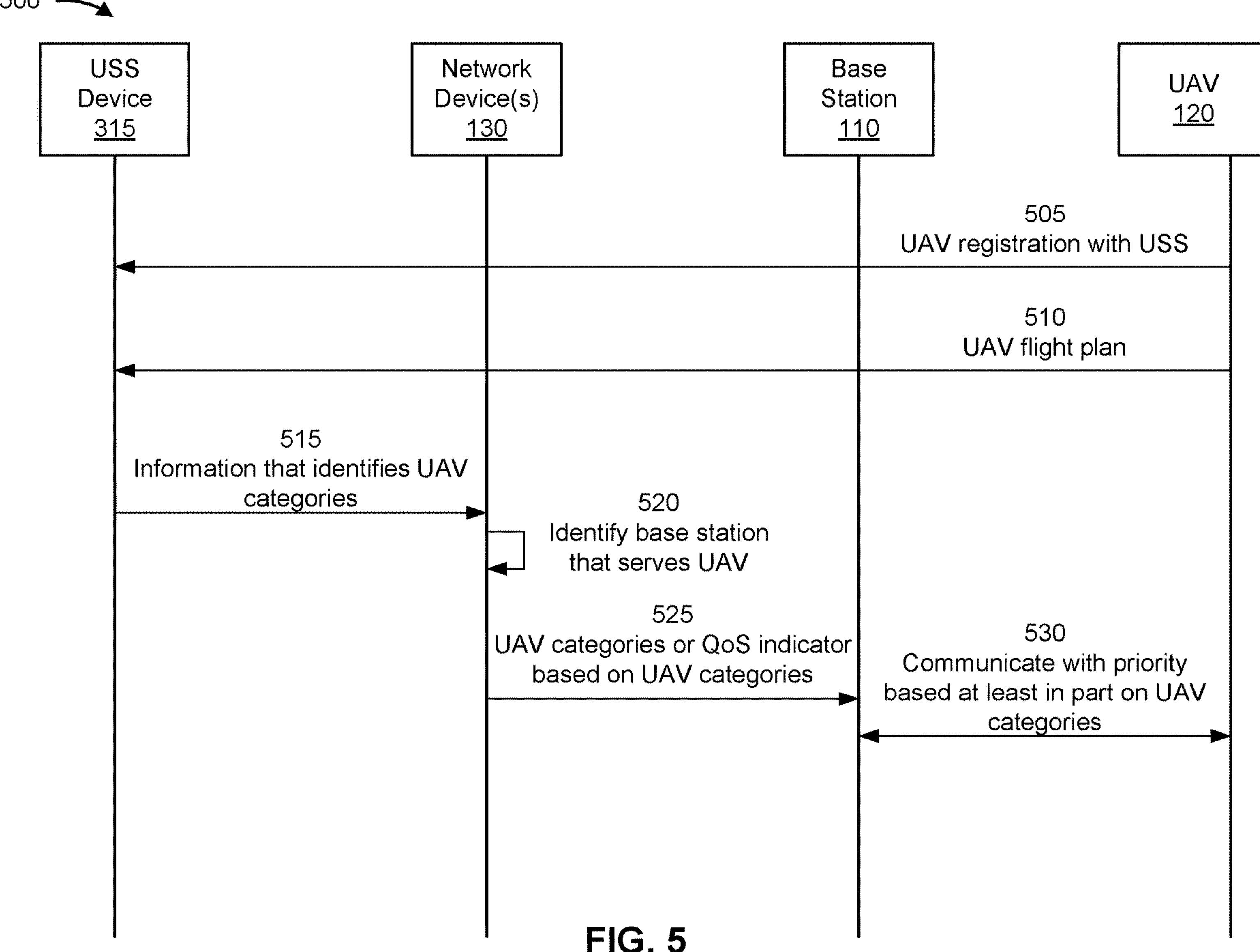
FIG. 5 is a diagram illustrating another example of provisioning UAV categories to a mobile network.

FIG. 5 is a diagram illustrating another example 500 of provisioning UAV categories to a mobile network, in accordance with the present disclosure. The communications depicted in FIG. 5 may be executed by the UAV 120 and the base station 110 in lieu of and/or in addition to the communications depicted in FIG. 4.

As shown in FIG. 5, the UE 120 may communicate with one or more network nodes (e.g., the base station 110) on a mobile network (e.g., a 5G network, an LTE network, and/or the like). In the example shown in FIG. 5, the UE 120 communicates with base station 110 on the mobile network, e.g., using RRC signaling and/or the like. However, the description below applies equally to the UE 120 communicating with a portion (e.g., network device(s) 130) of a core network supporting the base station 110, such as an MME/AMF and/or the like, e.g., using NAS signaling and/or the like.

As further shown in FIG. 5, the core network may include one or more network devices, such as network device(s) 130. As described above in connection with FIG. 3, network device(s) 130 may be an MME/AMF, an NEF/SCEF, an SMF, a PCF, a UFMS, and/or the like. The network device(s) 130 may communicate with a USS device 315, e.g., via the UFMS and/or another similar interface as described above in connection with FIG. 3.

At 505, the UAV 120 may transmit a communication associated with a registration of the UAV 120 with the USS device 315. In some aspects, the UAV 120 may use the mobile network (e.g., using base station 110 supported by the network device(s) 130) to transmit the communication. Additionally, or alternatively, the UAV 120 may use a separate communication channel to transmit the communication.

In some aspects, the UAV 120 may further provide one or more initial categories associated with the UAV to the USS device 315. As described above in connection with FIG. 4, the one or more initial categories may include at least one of a flight control type category, a flight category, a mission category, an area of operation category, or a combination thereof. In some aspects, the UAV 120 may include the one or more initial categories with the communication associated with the registration of the UAV 120 with the USS device 315. As an alternative, the communication associated with the registration of the UAV 120 with the USS device 315 may be separate from a communication including the one or more initial categories.

In some aspects, as described above in connection with FIG. 4, the UAV 120 may provide the one or more initial categories to the USS device 315 to permit the UAV service supplier to supply the one or more initial categories to the mobile network. For example, the USS device 315 may transmit the one or more initial categories, e.g., using NAS signaling and/or the like, to the network device(s) 130. In some aspects, the network device(s) 130 may include an AMF serving the base station 110. For example, the USS device 315 may receive an identification of the AMF serving the base station 110 from an NEF/SCEF of the core network and transmit the one or more initial categories based at least in part on the identification. Additionally, or alternatively, the network device(s) 130 may include an SMF of the core network supporting the base station 110. For example, the SMF may establish a PDU session for an AMF of the core network with the UAV 120 and deliver the one or more initial categories to the same AMF. Additionally, or alternatively, the network device(s) 130 may include an NEF/SCEF of the core network supporting the base station 110. For example, the NEF/SCEF may forward the one or more initial categories to the AMF serving the base station 110.

In some aspects, the base station 110 may communicate with the UAV 120 based at least in part on the one or more initial categories. For example, as described above with respect to FIG. 4, the base station 110 may prioritize, based at least in part on the one or more initial categories, one or more resources served by the mobile network that includes the base station 110.

At 510, the UAV 120 may transmit, to the USS device 315, a flight plan that includes one or more updated categories that are based at least in part on the flight plan. As described above in connection with FIG. 4, the one or more updated categories may include at least one of a flight control type category, a flight category, a mission category, an area of operation category, or a combination thereof.

The UAV 120 may transmit the flight plan to the USS device 315 to receive an approval of the flight plan from the USS device 315. In some aspects, the UAV 120 may also transmit the flight plan to the USS device 315 to permit the USS device 315 to supply the one or more updated categories to the mobile network. For example, as described below in connection with reference numbers 515, 520, and 525, the USS device 315 may supply the one or more updated categories to the mobile network using network device(s) 130.

At 515, the USS device 315 may transmit information identifying the one or more updated categories associated with the UAV 120 to the network device(s) 130. For example, the network device(s) 130 may include an AMF of the core network supporting the base station 110.

At 520, the network device(s) 130 may identify a base station (e.g., base station 110) that serves the UAV 120. For example, the AMF may identify the base station 110 currently served by the AMF. Additionally, or alternatively, the network device(s) 130 may include an NEF/SCEF of the core network that identifies the AMF currently serving the base station 110.

At 525, the network device(s) 130 may transmit the one or more updated categories to one or more network nodes in communication with the UAV 120 (e.g., the base station 110). For example, the network device(s) 130 may transmit the one or more updated categories based at least in part on identifying the base station 110 that serves the UAV 120. As described above with respect to reference number 520, the network device(s) 130 may include an AMF currently serving the base station 110 that transmits the one or more updated categories to the base station 110. Additionally, or alternatively, the network device(s) 130 may include an NEF/SCEF of the core network that transmits the one or more updated categories to the AMF currently serving the base station 110, which transmits the one or more updated categories to the base station 110.

As an alternative to reference numbers 515 and 520, the UAV 120 may transmit the one or more updated categories to the network device(s) 130, e.g., using NAS signaling and/or the like, for delivery to the base station 110. Additionally, or alternatively, the UAV 120 may transmit the one or more updated categories to the base station 110, e.g., using an RRC connection and/or the like.

In some aspects, the network device(s) 130 may determine a QoS indicator based at least in part on the one or more updated categories. For example, the network device(s) 130 may include a PCF that maps the one or more updated categories to a QoS indicator, as described above with respect to the FIG. 4. The network device(s) 130 may transmit the QoS indictor to the base station 110 (e.g., via the AMF currently serving the base station 110) in addition to or in lieu of the one or more updated categories. Additionally, or alternatively, the network device(s) 130 may further include an SMF of the core network that receives the QoS indicator from the PCF and uses the QoS indicator in a PDU session with the base station 110 (e.g., by providing the QoS indicator to a UPF with corresponding traffic filters and/or to the UAV 120, e.g., via NAS signaling, such that the UAV 120 uses the QoS indicator when communicating with the mobile network).

At 530, the base station 110 may communicate with the UAV 120 based at least in part on the one or more updated categories. For example, the base station 110 may prioritize, based at least in part on the one or more updated categories, one or more resources served by the mobile network that includes the base station 110, as described above with respect to FIG. 4.

In some aspects, the base station 110 may determine a measure of QoS based at least in part on the one or more updated categories, as described above with respect to FIG. 4. The base station 110 may prioritize one or more resources served by the mobile network that includes the base station 110 based at least in part on the measure of QoS. As an alternative, as described above in connection with reference number 525, the base station 110 may receive a QoS indicator from the network device(s) 130 in addition to or in lieu of the one or more updated categories.

In some aspects, the base station 110 may receive one or more first categories (e.g., one or more initial categories and/or one or more updated categories) from the network device(s) 130 and also receive one or more second categories from the UAV 120. The base station 110 may prioritize the one or more first categories from the network device(s) 130 over the one or more second categories from the UAV 120. For example, the base station 110 may discard some or all of the one or more second categories when the one or more second categories conflict with the one or more first categories.

In some aspects, the UAV 120 may further receive, from the mobile network, an indicator of an access class that is based at least in part on at least one of the one or more updated categories, the approval of the flight plan, or a combination thereof. The UAV 120 may obtain prioritized service from the mobile network using the access class. For example, the UAV 120 may use the access class during an emergency, during a more complicated portion of the flight plan, or at another time at which the UAV 120 desires a higher QoS than the one or more updated categories otherwise cause the mobile network to provide to the UAV 120. An access class may refer to a category or class of a UE or UAV 120 that controls a priority of that UE or UAV 120 with respect to accessing a network, such as to prevent overload of an access channel or access medium. A UE or UAV 120 may store its access class in memory, such as in a subscriber identity module (SIM).

As indicated above, FIG. 5 is provided as an example. Other examples may differ from what is described with respect to FIG. 5.

Figure 6:
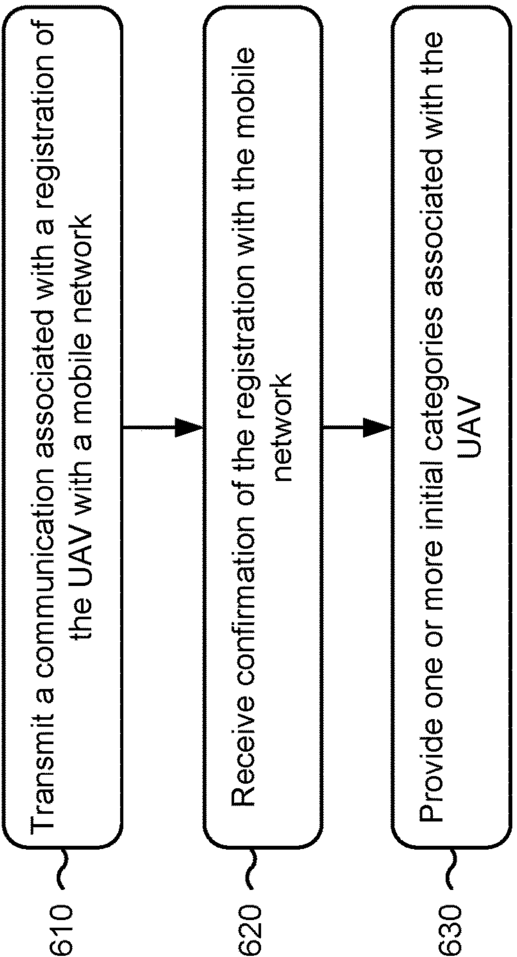
FIG. 6 is a flowchart of a method of wireless communication performed by a UAV.

FIG. 6 is a flowchart of a method 600 of wireless communication. The method may be performed by a UAV (e.g., the UAV 120 of FIG. 1, the apparatus 902 of FIG. 9, and/or the like).

At 610, the UAV may transmit a communication associated with a registration of the UAV with a mobile network. For example, the UAV (e.g., using receive processor 258, transmit processor 264, controller/processor 280, memory 282, and/or the like) may transmit the communication associated with the registration of the UAV with the mobile network, as described above. In some aspects, the UAV may transmit the communication to a base station (e.g., the base station 110 of FIG. 1, the apparatus 1102 of FIG. 11, and/or the like) using an RRC connection. Additionally, or alternatively, the UAV may transmit the communication to a portion of a core network (e.g., the network device(s) 130 of FIG. 1, the apparatus 1302 of FIG. 13, and/or the like) using NAS signaling. In some aspects, the mobile network is to provide service to the UAV during flight of the UAV.

At 620, the UAV may receive confirmation of the registration with the mobile network. For example, the UAV (e.g., using receive processor 258, transmit processor 264, controller/processor 280, memory 282, and/or the like) may receive the confirmation of the registration with the mobile network, as described above. In some aspects, the UAV may further receive, in combination with or separate from the confirmation, an indicator of an access class. The UAV may use the access class to obtain prioritized service from the mobile network.

At 630, the UAV may provide one or more initial categories associated with the UAV for association with the registration. For example, the UAV (e.g., using receive processor 258, transmit processor 264, controller/processor 280, memory 282, and/or the like) may provide the one or more initial categories associated with the UAV for association with the registration, as described above. In some aspects, the UAV may provide the one or more initial categories to the mobile network, e.g., using an RRC connection and/or NAS signaling. Additionally, or alternatively, the UAV may provide the one or more initial categories to a USS device to permit the USS device to supply the one or more initial categories to the mobile network. In some aspects, the one or more initial categories are associated with a characteristic of at least one of the UAV or a flight of the UAV.

Method 600 may include additional aspects, such as any single aspect or any combination of aspects described below and/or in connection with one or more other processes described elsewhere herein.

In a first aspect, the one or more initial categories include at least one of: a flight control type category, a flight category, a mission category, an area of operation category, or a combination thereof.

In a second aspect, alone or in combination with the first aspect, providing the one or more initial categories includes providing the one or more initial categories to a UAV service supplier to permit the UAV service supplier to supply the one or more initial categories to the mobile network.

In a third aspect, alone or in combination with one or more of the first and second aspects, providing the one or more initial categories includes providing the one or more initial categories with a communication associated with a registration of the UAV with the UAV service supplier.

In a fourth aspect, alone or in combination with one or more of the first through third aspects, providing the one or more initial categories includes providing the one or more initial categories to the mobile network.

In a fifth aspect, alone or in combination with one or more of the first through fourth aspects, providing the one or more initial categories includes providing the one or more initial categories with the communication associated with the registration of the UAV.

In a sixth aspect, alone or in combination with one or more of the first through fifth aspects, providing the one or more initial categories includes providing the one or more initial categories with a communication associated with a subscription of the UAV to the mobile network.

In a seventh aspect, alone or in combination with one or more of the first through sixth aspects, the communication associated with the registration of the UAV with the mobile network includes an indicator that triggers the mobile network to retrieve the one or more initial categories provided with the communication associated with the subscription of the UAV.

In an eighth aspect, alone or in combination with one or more of the first through seventh aspects, method 600 further includes transmitting, to a UAV service supplier, a flight plan that includes one or more updated categories that are based at least in part on the flight plan; and receiving, from the UAV service supplier, an approval of the flight plan.

In a ninth aspect, alone or in combination with one or more of the first through eighth aspects, transmitting the flight plan includes transmitting the flight plan that includes the one or more updated categories to the UAV service supplier to permit the UAV service supplier to supply the one or more updated categories to the mobile network.

In a tenth aspect, alone or in combination with one or more of the first through ninth aspects, method 600 includes further transmitting the one or more updated categories to the mobile network.

In an eleventh aspect, alone or in combination with one or more of the first through tenth aspects, method 600 further includes receiving, from the mobile network, an indicator of an access class that is based at least in part on at least one of the one or more updated categories, the approval of the flight plan, or a combination thereof.

In a twelfth aspect, alone or in combination with one or more of the first through eleventh aspects, method 600 further includes obtaining prioritized service from the mobile network using the access class.

Although FIG. 6 shows example blocks of method 600, in some aspects, method 600 may include additional blocks, fewer blocks, different blocks, or differently arranged blocks than those depicted in FIG. 6. Additionally, or alternatively, two or more of the blocks of method 600 may be performed in parallel.

Figure 7:
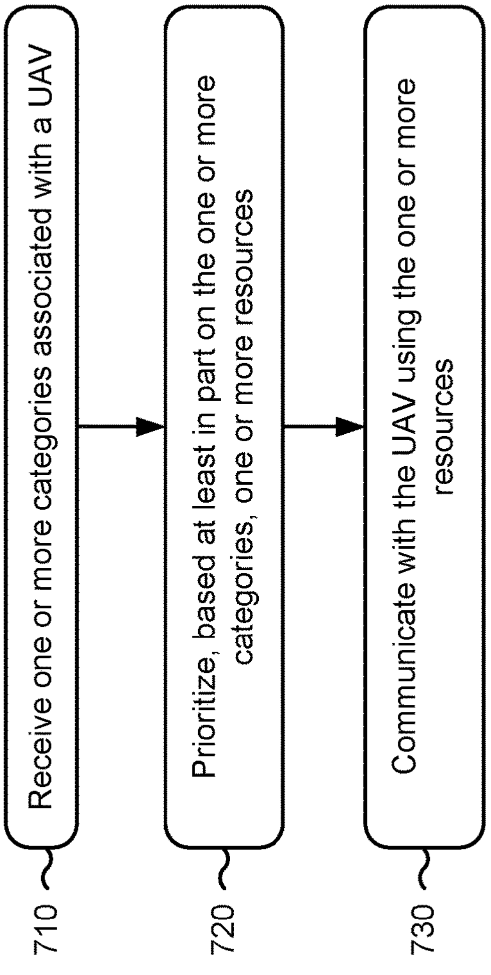
FIG. 7 is a flowchart of a method of wireless communication performed by a network node.

FIG. 7 is a flowchart of a method 700 of wireless communication. The method may be performed by a network node (e.g., the base station 110 of FIG. 1, the apparatus 1102 of FIG. 11, and/or the like).

At 710, the network node may receive one or more categories associated with a UAV.

For example, the network node (e.g., using receive processor 238, controller/processor 240, memory 242, and/or the like) may receive the one or more categories associated with the UAV, as described above. In some aspects, the network node may receive the one or more categories from the UAV, e.g., via an RRC connection. Additionally, or alternatively, the network node may receive the one or more categories from an AMF of a core network supporting the network node. In some aspects, the one or more categories are associated with a characteristic of at least one of the UAV or a flight of the UAV.

At 720, the network node may prioritize, based at least in part on the one or more categories, one or more resources served by a network that includes the network node. For example, the network node (e.g., using receive processor 238, controller/processor 240, memory 242, and/or the like) may prioritize, based at least in part on the one or more categories, the one or more resources, as described above. In some aspects, the network node may determine a measure of QoS based at least in part on the one or more categories and prioritize the one or more resources to provide the determined QoS to the UAV. Additionally, or alternatively, the network node may receive a QoS indicator in addition to or in lieu of the one or more categories and prioritize the one or more resources based at least in part on the QoS indicator. In some aspects, at least one of the network or the network node provides service to the UAV during flight of the UAV.

At 730, the network node may communicate with the UAV using the one or more resources. For example, the network node (e.g., using receive processor 238, controller/processor 240, memory 242, and/or the like) may communicate with the UAV using the one or more resources. In some aspects, the network node may provide a determined QoS to the UAV using the one or more resources, as described above in connection with reference number 720. In some aspects, the network node may provide prioritized service to the UAV when the UAV uses an access class provided to the UAV by the network node. For example, the UAV may use the access class when it desires a higher QoS than the determined QoS.

Method 700 may include additional aspects, such as any single aspect or any combination of aspects described below and/or in connection with one or more other processes described elsewhere herein.

In a first aspect, receiving the one or more categories includes receiving the one or more categories from the UAV.

In a second aspect, alone or in combination with the first aspect, receiving the one or more categories includes receiving the one or more categories from an AMF of the network.

In a third aspect, alone or in combination with one or more of the first and second aspects, receiving the one or more categories includes receiving the one or more categories from a UAV service supplier via the AMF of the network.

In a fourth aspect, alone or in combination with one or more of the first through third aspects, receiving the one or more categories includes receiving the one or more categories from at least one of an SMF or an NEF of the network via the AMF of the network.

In a fifth aspect, alone or in combination with one or more of the first through fourth aspects, receiving the one or more categories includes receiving the one or more categories retrieved by the AMF of the network from a storage.

In a sixth aspect, alone or in combination with one or more of the first through fifth aspects, the one or more categories are one or more first categories, and method 700 further includes receiving one or more second categories from the UAV, and prioritizing the one or more first categories from the AMF of the network over the one or more second categories from the UAV.

In a seventh aspect, alone or in combination with one or more of the first through sixth aspects, receiving the one or more categories includes receiving a QoS indicator associated with the one or more categories.

In an eighth aspect, alone or in combination with one or more of the first through seventh aspects, method 700 includes determining a measure of QoS based at least in part on the one or more categories, wherein the prioritizing is being based at least in part on the measure of QoS.

Although FIG. 7 shows example blocks of method 700, in some aspects, method 700 may include additional blocks, fewer blocks, different blocks, or differently arranged blocks than those depicted in FIG. 7. Additionally, or alternatively, two or more of the blocks of method 700 may be performed in parallel.

Figure 8:
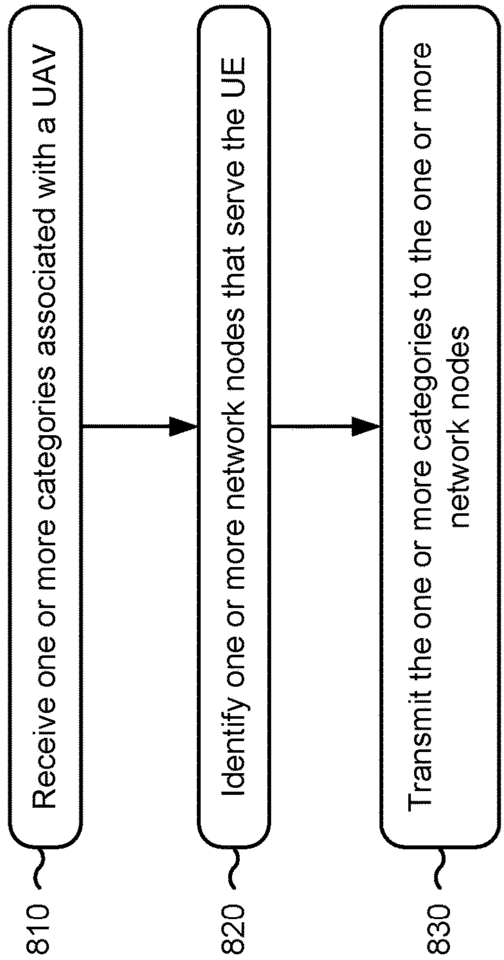
FIG. 8 is a flowchart of a method of wireless communication performed by a network device.

FIG. 8 is a flowchart of a method 800 of wireless communication. The method may be performed by a network device (e.g., the network device(s) 130 of FIG. 1, the apparatus 1302 of FIG. 13, and/or the like).

At 810, the network device may receive one or more categories associated with a UAV. For example, the network device (e.g., using receive processor 238, controller/processor 240, memory 242, and/or the like) may receive the one or more categories associated with the UAV, as described above. In some aspects, the network device may receive the one or more categories from the UAV, e.g., via NAS signaling. Additionally, or alternatively, the network device may receive the one or more categories from a USS device. In some aspects, the one or more categories are associated with a characteristic of at least one of the UAV or a flight of the UAV.

At 820, the network device may identify one or more network nodes that serve the UAV. For example, the network device (e.g., using receive processor 238, controller/processor 240, memory 242, and/or the like) may identify the one or more network nodes that serve the UAV, as described above. In some aspects, the network device may include an MME/AMF that serves the UAV and identifies a base station that serves the UAV. Additionally, or alternatively, the network device may include an NEF/SCEF that identifies an MME/AMF serving the base station.

At 830, the network device may transmit the one or more categories to the one or more network nodes in communication with the UAV. For example, the network device (e.g., using receive processor 238, controller/processor 240, memory 242, and/or the like) may transmit the one or more categories to the one or more network nodes, as described above. In some aspects, the network device may include a UFMS or other interface that transmits the one or more categories to an AMF identified as serving the base station that serves the UAV. Additionally, or alternatively, the UFMS may transmit the one or more categories to at least one of an SMF or an NEF/SCEF associated with the one or more network nodes. In some aspects, the one or more network nodes provide service to the UAV during flight of the UAV.

Method 800 may include additional aspects, such as any single aspect or any combination of aspects described below and/or in connection with one or more other processes described elsewhere herein.

In a first aspect, receiving the one or more categories associated with the UAV includes receiving the one or more categories from the UAV.

In a second aspect, alone or in combination with the first aspect, receiving the one or more categories associated with the UAV includes receiving the one or more categories from a UAV service supplier.

In a third aspect, alone or in combination with one or more of the first and second aspects, receiving the one or more categories associated with the UAV includes receiving the one or more categories from an SMF or an NEF associated with the one or more network nodes in communication with the UAV.

In a fourth aspect, alone or in combination with one or more of the first through third aspects, method 800 further includes receiving an indication of an access and mobility management function (AMF) serving the UAV, wherein transmitting the one or more categories to the one or more network nodes in communication with the UAV includes transmitting the one or more categories to the AMF based at least in part on the indication.

In a fifth aspect, alone or in combination with one or more of the first through fourth aspects, receiving the indication of the AMF serving the UAV includes receiving the indication from an NEF associated with the one or more network nodes in communication with the UAV.

In a sixth aspect, alone or in combination with one or more of the first through fifth aspects, transmitting the one or more categories to the one or more network nodes in communication with the UAV includes transmitting the one or more categories to at least one of an SMF or an NEF associated with the one or more network nodes in communication with the UAV.

In a seventh aspect, alone or in combination with one or more of the first through sixth aspects, transmitting the one or more categories to the one or more network nodes in communication with the UAV includes transmitting the one or more categories to a PCF to permit the PCF to determine a QoS indicator based at least in part on the one or more categories and transmit the QoS indicator to at least one of an SMF or an NEF associated with the one or more network nodes in communication with the UAV.

Although FIG. 8 shows example blocks of method 800, in some aspects, method 800 may include additional blocks, fewer blocks, different blocks, or differently arranged blocks than those depicted in FIG. 8. Additionally, or alternatively, two or more of the blocks of method 800 may be performed in parallel.

Figure 9:
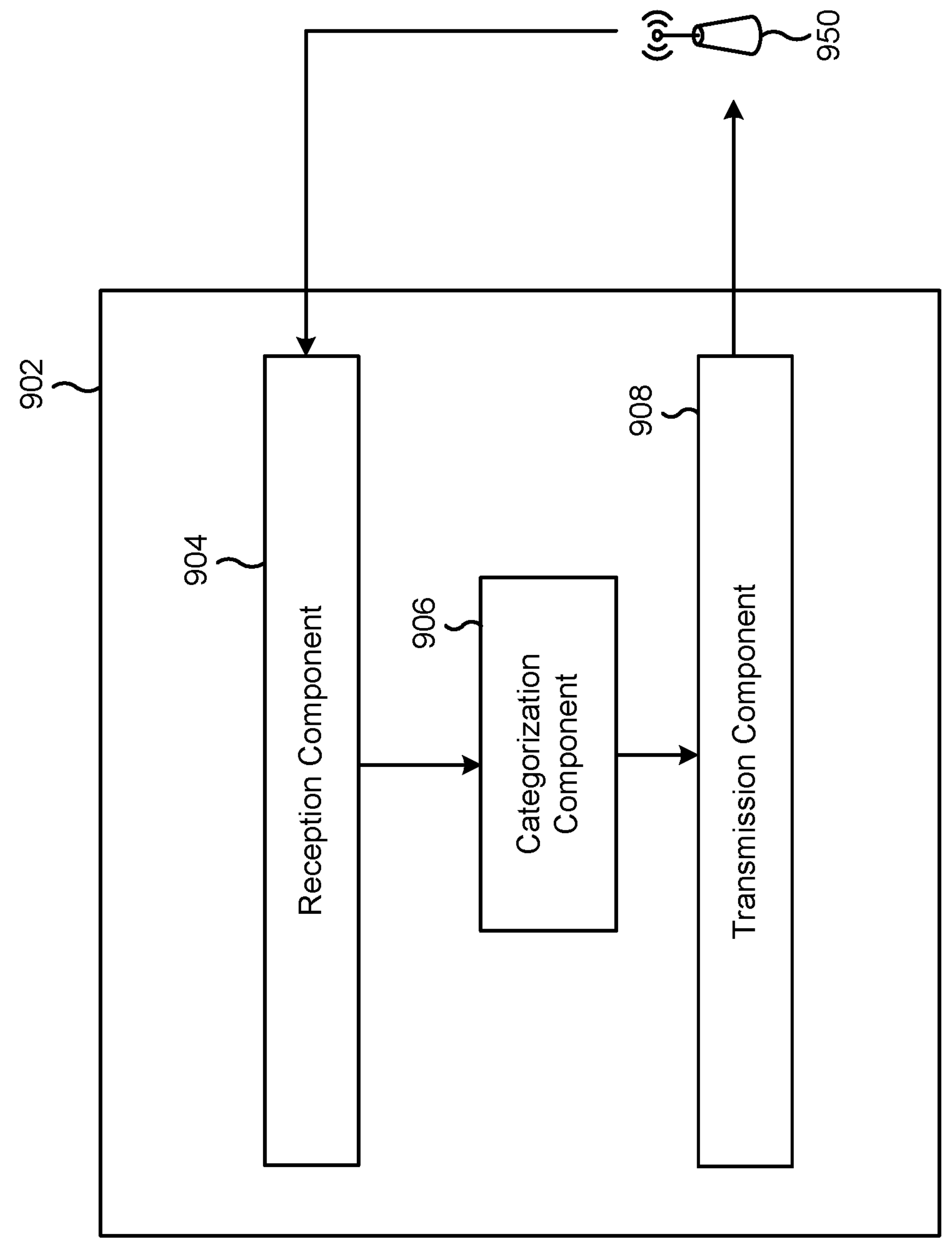
FIG. 9 is a conceptual data flow diagram illustrating the data flow between different components in an example apparatus.

FIG. 9 is a conceptual data flow diagram 900 illustrating the data flow between different components in an example apparatus 902. The apparatus 902 may be a UAV (e.g., UAV 120). In some aspects, the apparatus 902 includes a reception component 904, a categorization component 906, and/or a transmission component 908.

In some aspects, the transmission component 908 may transmit (e.g., to an apparatus 950, such as a network node, e.g., a base station, an MME/AMF, and/or the like) a communication associated with a registration of the apparatus 902. For example, the transmission component 908 may register the apparatus 902 with the mobile network in order to use the mobile network during a flight of the apparatus 902. The transmission component 908 may transmit the communication to an apparatus 950, such as a network node, e.g., a base station, an MME/AMF, and/or the like.

In some aspects, the categorization component 906 may determine one or more categories associated with the apparatus 902. For example, the one or more categories may include at least one of a flight control type category, a flight category, a mission category, an area of operation category, or a combination thereof. In some aspects, the categorization component 906 may determine the one or more categories based at least in part on a flight plan for the apparatus 902. For example, the flight plan may been received from a controller of the apparatus 902 (e.g., using reception component 904).

In some aspects the transmission component 908 may further transmit (e.g., to an apparatus 950, such as a network node, e.g., a base station, an MME/AMF, and/or the like) the one or more categories determined by the categorization component 906. The transmission component 908 may send the one or more categories separately from the communication associated with the registration of the apparatus 902. As an alternative, the transmission component 908 may send the one or more categories with the communication associated with the registration of the apparatus 902.

In some aspects, the reception component 904 may receive (e.g., from an apparatus 950, such as a network node, e.g., a base station, an MME/AMF, and/or the like) confirmation of the registration of the apparatus 902 with the mobile network. In some aspects, the reception component 904 may further receive (e.g., from an apparatus 950, such as a network node, e.g., a base station, an MME/AMF, and/or the like) an access class that the apparatus 902 may use to receive prioritized service. For example, the transmission component 908 may transmit (e.g., to an apparatus 950, such as a network node, e.g., a base station, an MME/AMF, and/or the like) the access class when the apparatus 902 desires a higher quality and/or reliability of service than that to which the apparatus 902 is entitled by the one or more categories determined by the categorization component 906.

The apparatus may include additional components that perform each of the blocks of the algorithm in the aforementioned method 600 of FIG. 6 and/or the like. Each block in the aforementioned method 600 of FIG. 6 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of components (e.g., one or more components) shown in FIG. 9 may perform one or more functions described as being performed by another set of components shown in FIG. 9.

Figure 10:
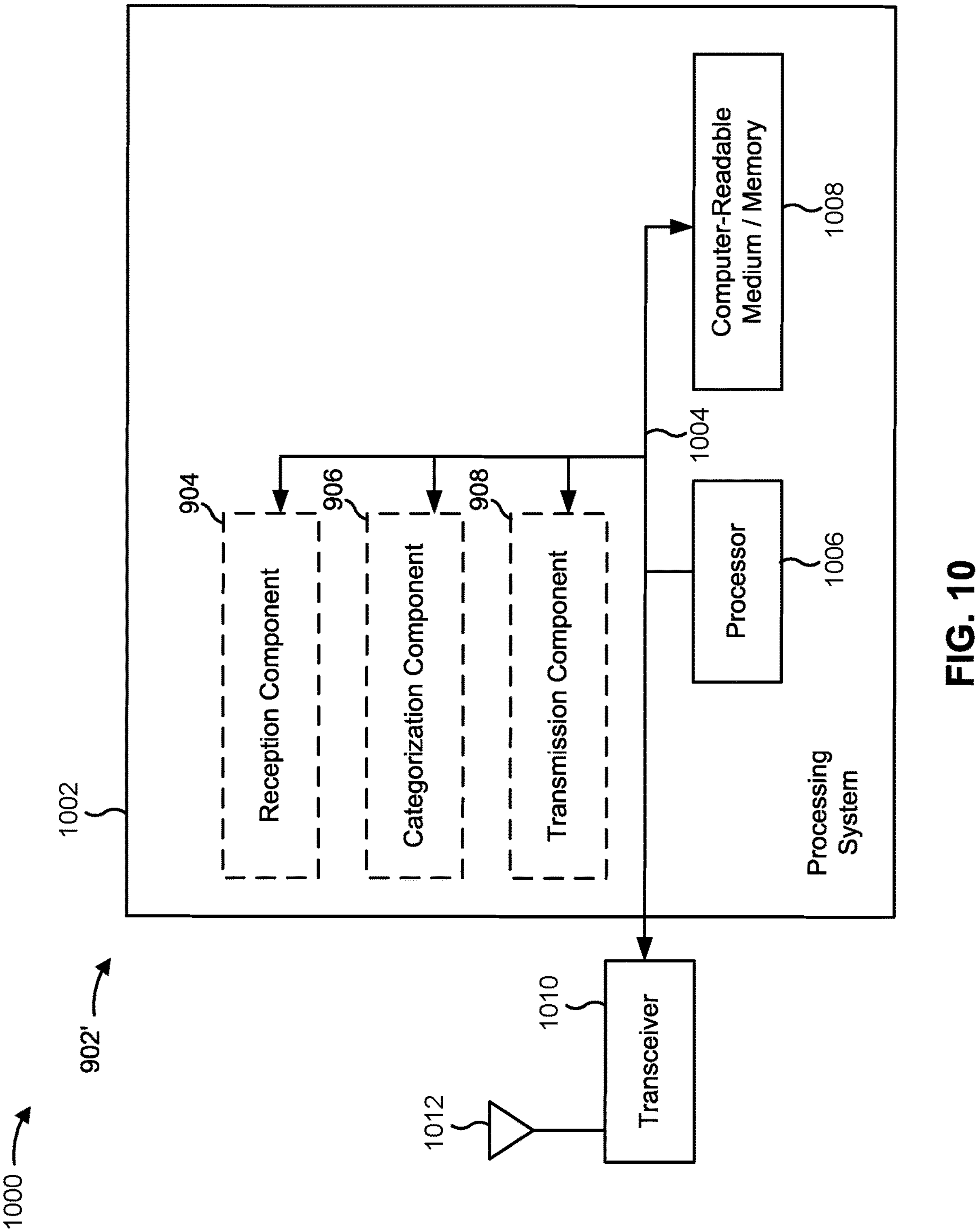
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE (e.g., UE 120).

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware components, represented by the processor 1006, the components 904, 906, and/or 908, and the computer-readable medium/memory 1008. The bus 1004 may also link various other circuits such as timing sources, peripherals, voltage regulators, and power management circuits, which are well known in the art, and therefore will not be described any further.

The processing system 1002 may be coupled to a transceiver 1010. The transceiver 1010 is coupled to one or more antennas 1012. The transceiver 1010 provides a means for communicating with various other apparatuses over a transmission medium. The transceiver 1010 receives a signal from the one or more antennas 1012, extracts information from the received signal, and provides the extracted information to the processing system 1002, specifically the reception component 904. In addition, the transceiver 1010 receives information from the processing system 1002, specifically the transmission component 908, and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described herein for any particular apparatus. The computer-readable medium/memory 1008 may also be used for storing data that is manipulated by the processor 1006 when executing software. The processing system further includes at least one of the components 904, 906, and/or 908. The components may be software modules miming in the processor 1006, resident/stored in the computer-readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for transmitting a communication associated with a registration of the UAV with a mobile network; means for providing one or more initial categories associated with the UAV for association with the registration; and/or the like. The aforementioned means may be one or more of the aforementioned components of the apparatus 902 and/or the processing system 1002 of the apparatus 902' configured to perform the functions recited by the aforementioned means. As described elsewhere herein, the processing system 1002 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 10 is provided as an example. Other examples may differ from what is described in connection with FIG. 10.

Figure 11:
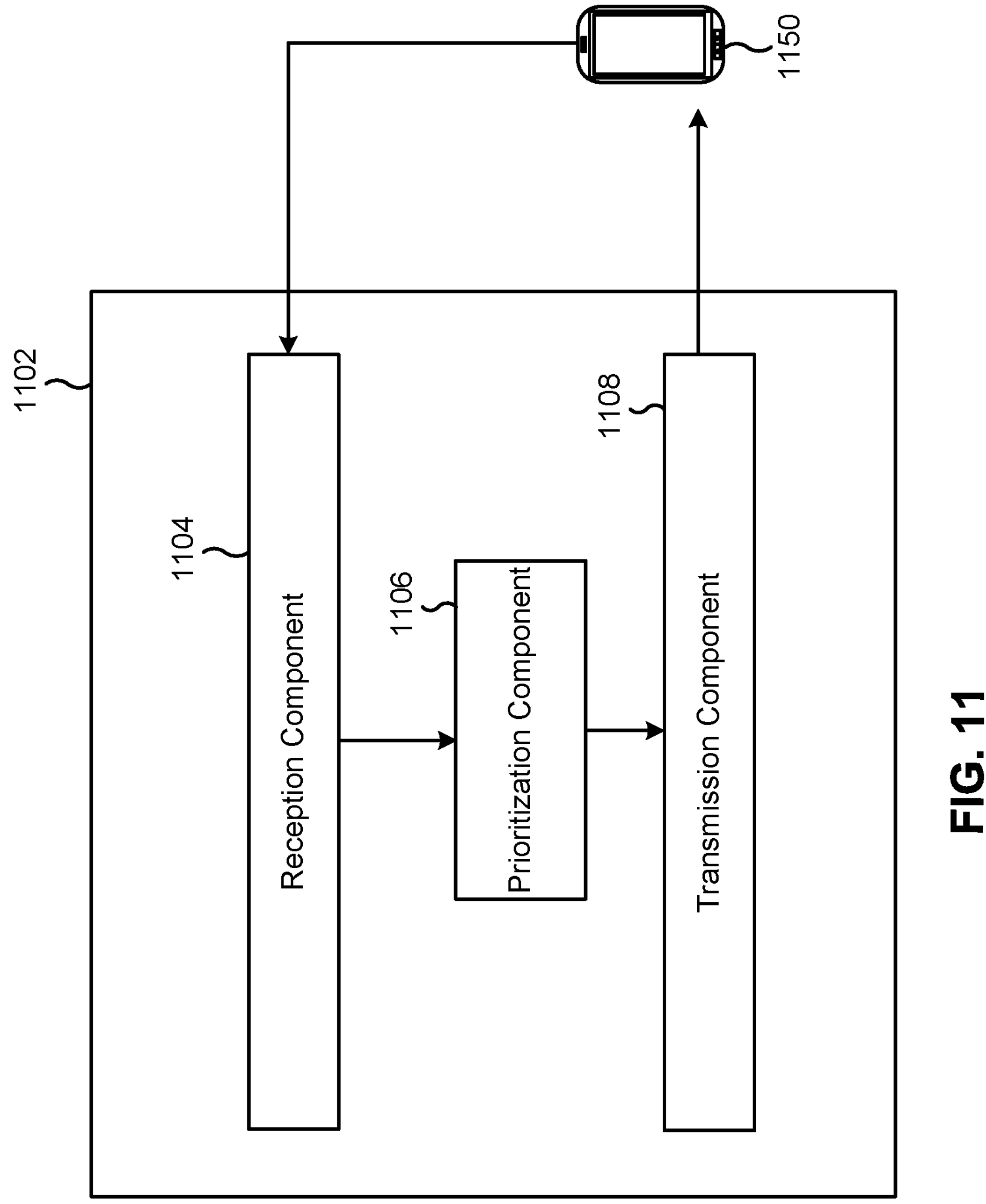
FIG. 11 is a conceptual data flow diagram illustrating the data flow between different components in an example apparatus.

FIG. 11 is a conceptual data flow diagram 1100 illustrating the data flow between different components in an example apparatus 1102. The apparatus 1102 may be a network node (e.g., base station 110). In some aspects, the apparatus 1102 includes a reception component 1104, a prioritization component 1106, and/or a transmission component 1108.

In some aspects, the reception component 1104 may receive (e.g., from an apparatus 1150, such as a UAV) one or more categories associated with a UAV. For example, the one or more categories may include at least one of a flight control type category, a flight category, a mission category, an area of operation category, or a combination thereof. In some aspects, the reception component 1104 may additionally or alternatively receive the one or more categories from a portion of a core network supporting apparatus 1102. For example, the reception component 1104 may receive the one or more categories from an AMF of the core network.

In some aspects, the prioritization component 1106 may prioritize, based at least in part on the one or more categories, one or more resources served by a network that includes the apparatus 1102. For example, the prioritization component 1106 may determine a measure of QoS based at least in part on the one or more categories received by the reception component 1104 and prioritize the one or more resources to provide the determined QoS to the UAV. Additionally, or alternatively, the reception component 1104 may receive a QoS indicator in addition to or in lieu of the one or more categories, and the prioritization component 1106 may prioritize the one or more resources based at least in part on the QoS indicator.

In some aspects, the transmission component 1108 may transmit (e.g., to an apparatus 1150, such as a UAV) communications according to the prioritization from the prioritization component 1106. Additionally, or alternatively, the reception component 1104 may schedule monitoring of the one or more resources according to the prioritization from the prioritization component 1106. In some aspects, the transmission component 1108 and/or the reception component 1104 may provide prioritized service to an apparatus 1150, such as a UAV, when the reception component 1104 receives an access class from the apparatus 1150.

The apparatus may include additional components that perform each of the blocks of the algorithm in the aforementioned method 700 of FIG. 7 and/or the like. Each block in the aforementioned method 700 of FIG. 7 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of components (e.g., one or more components) shown in FIG. 11 may perform one or more functions described as being performed by another set of components shown in FIG. 7.

Figure 12:
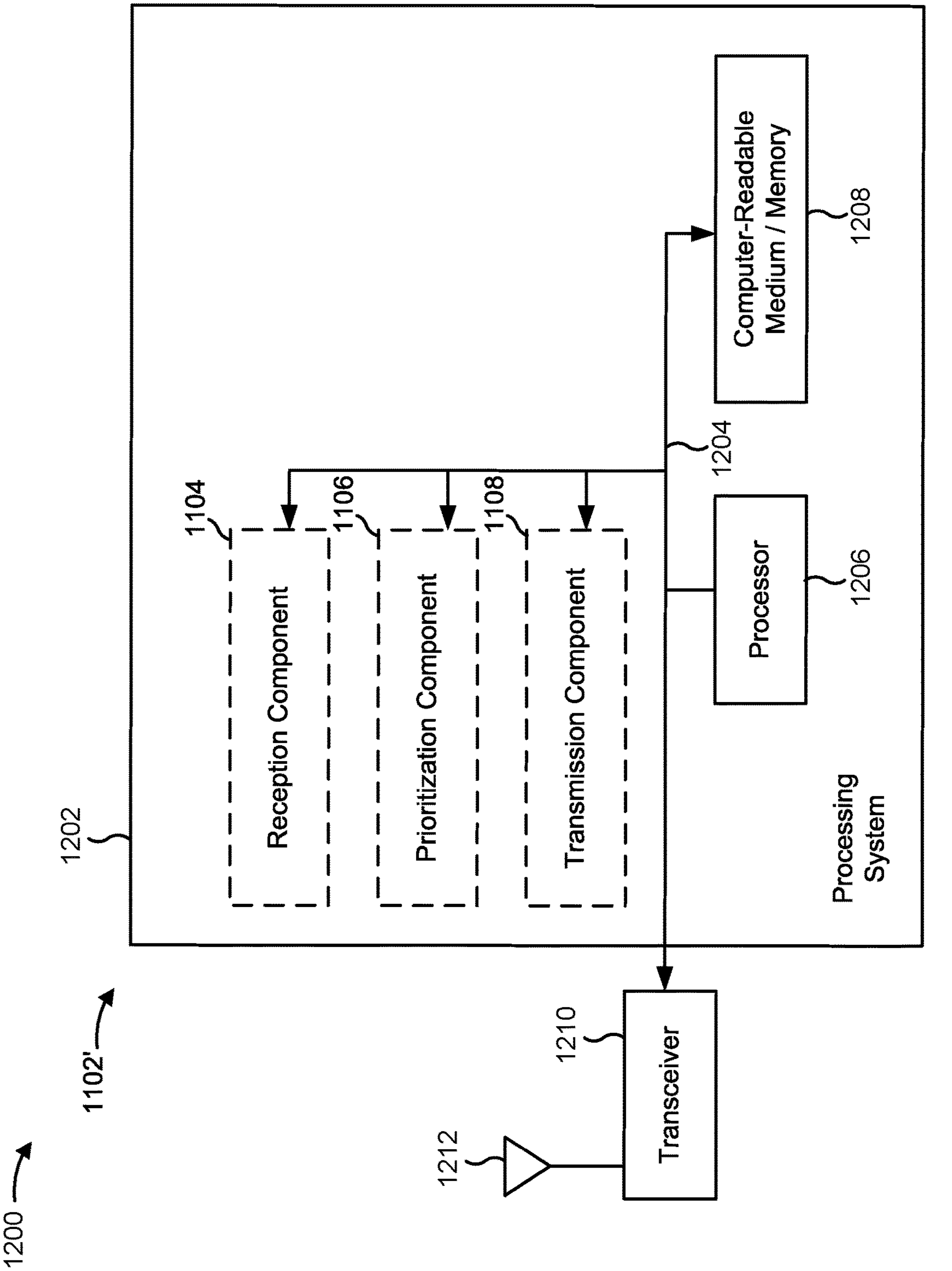
FIG. 12 is a diagram illustrating an example of a hardware implementation for an apparatus employing a processing system.

FIG. 12 is a diagram 1200 illustrating an example of a hardware implementation for an apparatus 1102' employing a processing system 1202. The apparatus 1102' may be a network node (e.g., base station 110).

The processing system 1202 may be implemented with a bus architecture, represented generally by the bus 1204. The bus 1204 may include any number of interconnecting buses and bridges depending on the specific application of the processing system 1202 and the overall design constraints. The bus 1204 links together various circuits including one or more processors and/or hardware components, represented by the processor 1206, the components 1104, 1106, and/or 1108, and the computer-readable medium/memory 1208. The bus 1204 may also link various other circuits such as timing sources, peripherals, voltage regulators, and power management circuits, which are well known in the art, and therefore will not be described any further.

The processing system 1202 may be coupled to a transceiver 1210. The transceiver 1210 is coupled to one or more antennas 1212. The transceiver 1210 provides a means for communicating with various other apparatuses over a transmission medium. The transceiver 1210 receives a signal from the one or more antennas 1212, extracts information from the received signal, and provides the extracted information to the processing system 1202, specifically the reception component 1104. In addition, the transceiver 1210 receives information from the processing system 1202, specifically the transmission component 1108, and based at least in part on the received information, generates a signal to be applied to the one or more antennas 1212. The processing system 1202 includes a processor 1206 coupled to a computer-readable medium/memory 1208. The processor 1206 is responsible for general processing, including the execution of software stored on the computer-readable medium/memory 1208. The software, when executed by the processor 1206, causes the processing system 1202 to perform the various functions described herein for any particular apparatus. The computer-readable medium/memory 1208 may also be used for storing data that is manipulated by the processor 1206 when executing software. The processing system further includes at least one of the components 1104, 1106, and/or 1108. The components may be software modules running in the processor 1206, resident/stored in the computer-readable medium/memory 1208, one or more hardware modules coupled to the processor 1206, or some combination thereof. The processing system 1202 may be a component of the base station 110 and may include the memory 242 and/or at least one of the TX MIMO processor 230, the RX processor 238, and/or the controller/processor 240.

In some aspects, the apparatus 1102/1102' for wireless communication includes means for transmitting, to a UE, an indication of a format of a plurality of formats for reporting flight path information of the UE; means for transmitting, to the UE, a request for the flight path information; means for receiving the flight path information from the UE according to the format and based at least in part on transmitting the request for the flight path information; and/or the like. The aforementioned means may be one or more of the aforementioned components of the apparatus 1102 and/or the processing system 1202 of the apparatus 1102' configured to perform the functions recited by the aforementioned means. As described elsewhere herein, the processing system 1202 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

Figure 13:
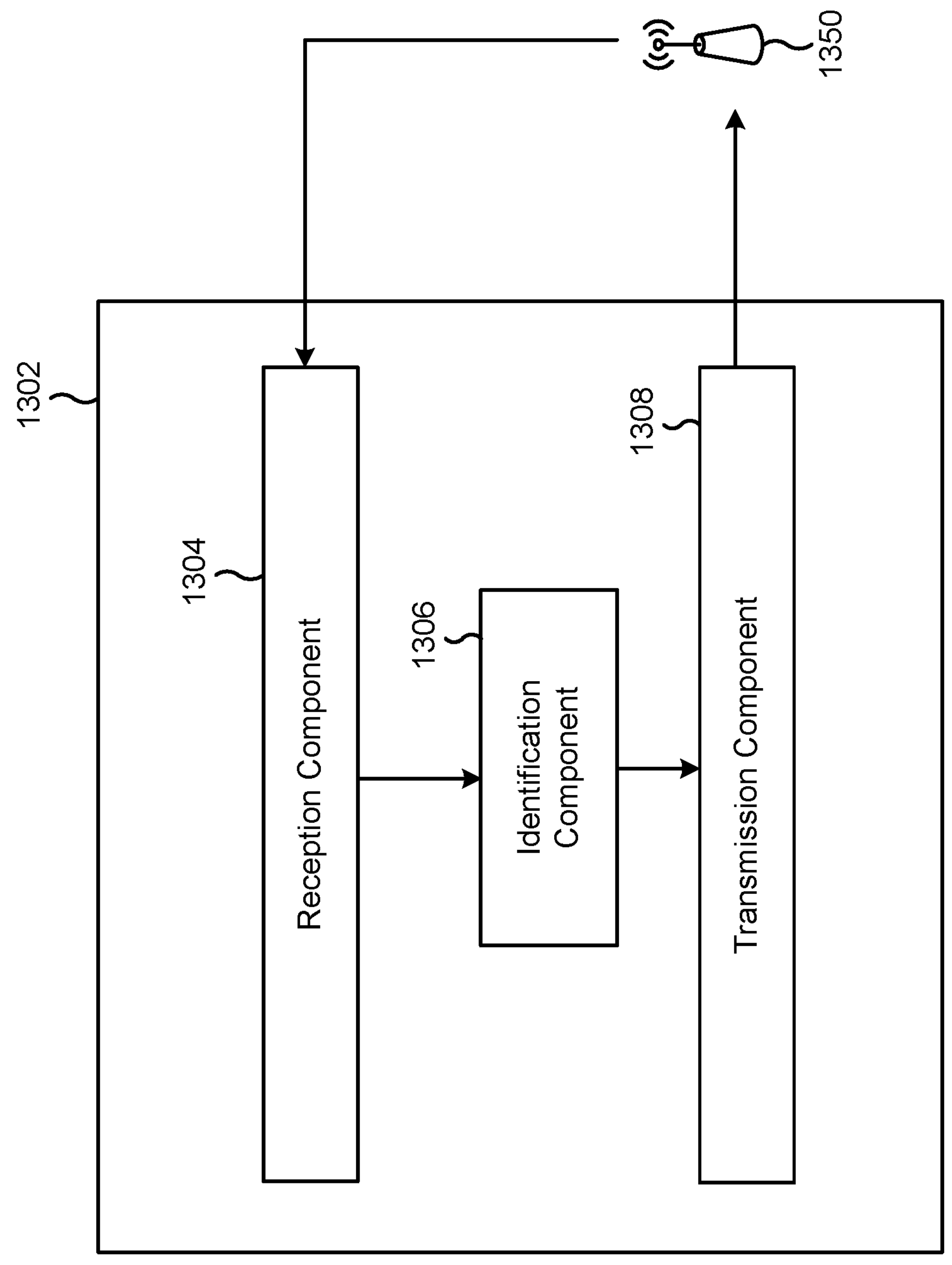
FIG. 13 is a conceptual data flow diagram illustrating the data flow between different components in an example apparatus.

FIG. 13 is a conceptual data flow diagram 1300 illustrating the data flow between different components in an example apparatus 1302. The apparatus 1302 may be a network device (e.g., network device(s) 130). In some aspects, the apparatus 1302 includes a reception component 1304, an identification component 1306, and/or a transmission component 1308.

In some aspects, the reception component 1304 may receive (e.g., from an apparatus 1350, such as a USS device, an NEF/SCEF, and/or the like) one or more categories associated with a UAV. For example, the apparatus 1350, such as a USS device, may transmit the one or more categories based at least in part on approving a flight plan from the UAV. Additionally, or alternatively, the network device may receive the one or more categories directly from the UAV, e.g., via NAS signaling.

In some aspects, the identification component 1306 may identify one or more network nodes that serve the UE. In some aspects, the identification component 1306 may retrieve an indicator of the base station that serves the UAV from a storage or from an MME/AMF that serves the UAV (e.g., using reception component 1304 and/or transmission component 1308). Additionally, or alternatively, the identification component 1306 may retrieve an indicator of the MME/AMF that serves the UAV from a storage or from an SMF that established a PDU session with the UAV (e.g., using reception component 1304 and/or transmission component 1308).

In some aspects, the transmission component 1308 may transmit the one or more categories to the one or more network nodes identified by the identification component 1306. In some aspects, transmission component 1308 may transmit the one or more categories to an AMF identified by the identification component 1306 as serving the base station that serves the UAV. Additionally, or alternatively, the transmission component 1308 may transmit the one or more categories to at least one of an SMF or an NEF/SCEF associated with the one or more network nodes identified by the identification component 1306.

The apparatus may include additional components that perform each of the blocks of the algorithm in the aforementioned method 800 of FIG. 8 and/or the like. Each block in the aforementioned method 800 of FIG. 8 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of components (e.g., one or more components) shown in FIG. 13 may perform one or more functions described as being performed by another set of components shown in FIG. 13.

Figure 14:
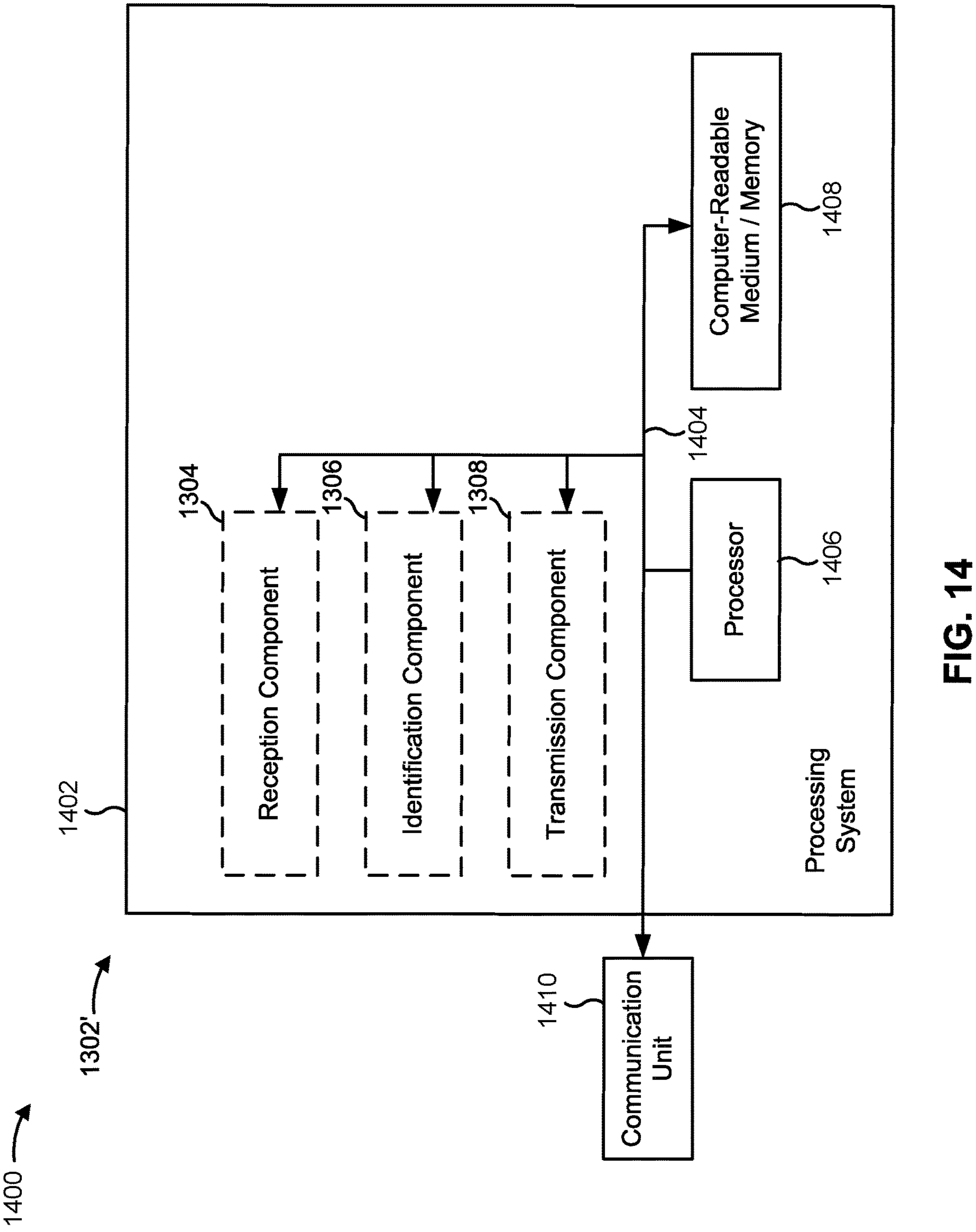
FIG. 14 is a diagram illustrating an example of a hardware implementation for an apparatus employing a processing system.

FIG. 14 is a diagram 1400 illustrating an example of a hardware implementation for an apparatus 1302' employing a processing system 1402. The apparatus 1302' may be a network device (e.g., network device(s) 130).

The processing system 1402 may be implemented with a bus architecture, represented generally by the bus 1404. The bus 1404 may include any number of interconnecting buses and bridges depending on the specific application of the processing system 1402 and the overall design constraints. The bus 1404 links together various circuits including one or more processors and/or hardware components, represented by the processor 1406, the components 1304, 1306, and/or 1308, and the computer-readable medium/memory 1408. The bus 1404 may also link various other circuits such as timing sources, peripherals, voltage regulators, and power management circuits, which are well known in the art, and therefore will not be described any further.

The processing system 1402 may be coupled to a communication unit 1410. The communication unit 1410 may include a means for communicating with various other apparatuses over a wired or wireless connection. The communication unit 1410 receives a signal, extracts information from the received signal, and provides the extracted information to the processing system 1402, specifically the reception component 1304. In addition, the communication unit 1410 receives information from the processing system 1402, specifically the transmission component 1308, and based at least in part on the received information, generates a signal to be sent over the wired or wireless connection. The processing system 1402 includes a processor 1406 coupled to a computer-readable medium/memory 1408. The processor 1406 is responsible for general processing, including the execution of software stored on the computer-readable medium/memory 1408. The software, when executed by the processor 1406, causes the processing system 1402 to perform the various functions described herein for any particular apparatus. The computer-readable medium/memory 1408 may also be used for storing data that is manipulated by the processor 1406 when executing software. The processing system further includes at least one of the components 1304, 1306, and/or 1308. The components may be software modules running in the processor 1406, resident/stored in the computer-readable medium/memory 1408, one or more hardware modules coupled to the processor 1406, or some combination thereof. The processing system 1402 may be a component of the network device(s) 130 and may include the memory 292 and/or the controller/processor 290.

In some aspects, the apparatus 1302/1302' for wireless communication includes means for receiving information that identifies a UE and a format of a plurality of formats for reporting flight path information by the UE; means for identifying a base station that serves the UE; means for transmitting, to the base station, a format indicator that identifies the format and a UE identifier that identifies the UE; and/or the like. The aforementioned means may be one or more of the aforementioned components of the apparatus 1302 and/or the processing system 1402 of the apparatus 1302' configured to perform the functions recited by the aforementioned means. As described elsewhere herein, the processing system 1402 may include the controller/processor 290. In one configuration, the aforementioned means may be the controller/processor 290 configured to perform the functions and/or operations recited herein.

FIG. 14 is provided as an example. Other examples may differ from what is described in connection with FIG. 14.

The following provides an overview of some Aspects of the present disclosure:

Aspect 1: A method of wireless communication performed by an unmanned aerial vehicle (UAV), comprising: transmitting a communication associated with a registration of the UAV with a mobile network; and providing one or more initial categories associated with the UAV for association with the registration.

Aspect 2: The method of Aspect 1, wherein the one or more initial categories include at least one of: a flight control type category, a flight category, a mission category, an area of operation category, or a combination thereof.

Aspect 3: The method of any of Aspects 1-2, wherein providing the one or more initial categories includes providing the one or more initial categories to a UAV service supplier to permit the UAV service supplier to supply the one or more initial categories to the mobile network.

Aspect 4: The method of Aspect 3, wherein providing the one or more initial categories includes providing the one or more initial categories with a communication associated with a registration of the UAV with the UAV service supplier.

Aspect 5: The method of any of Aspects 1-4, wherein providing the one or more initial categories includes providing the one or more initial categories to the mobile network.

Aspect 6: The method of Aspect 5, wherein providing the one or more initial categories includes providing the one or more initial categories with the communication associated with the registration of the UAV.

Aspect 7: The method of any of Aspects 5-6, wherein providing the one or more initial categories includes providing the one or more initial categories with a communication associated with a subscription of the UAV to the mobile network.

Aspect 8: The method of Aspect 7, wherein the communication associated with the registration of the UAV with the mobile network includes an indicator that triggers the mobile network to retrieve the one or more initial categories provided with the communication associated with the subscription of the UAV.

Aspect 9: The method of any of Aspects 1-8, further comprising: transmitting, to a UAV service supplier, a flight plan that includes one or more updated categories that are based at least in part on the flight plan; and receiving, from the UAV service supplier, an approval of the flight plan.

Aspect 10: The method of Aspect 9, wherein transmitting the flight plan includes transmitting the flight plan that includes the one or more updated categories to the UAV service supplier to permit the UAV service supplier to supply the one or more updated categories to the mobile network.

Aspect 11: The method of any of Aspects 9-10, further comprising: transmitting the one or more updated categories to the mobile network.

Aspect 12: The method of any of Aspects 9-11, further comprising: receiving, from the mobile network, an indicator of an access class that is based at least in part on at least one of the one or more updated categories, the approval of the flight plan, or a combination thereof.

Aspect 13: The method of Aspect 12, further comprising: obtaining prioritized service from the mobile network using the access class.

Aspect 14: The method of any of Aspects 1-13, wherein the mobile network is to provide service to the UAV during flight of the UAV.

Aspect 15: The method of any of Aspects 1-14, wherein the one or more initial categories are associated with a characteristic of at least one of the UAV or a flight of the UAV.

Aspect 16: A method of wireless communication performed by a network node, comprising: receiving one or more categories associated with an unmanned aerial vehicle (UAV); and prioritizing, based at least in part on the one or more categories, one or more resources served by a network that includes the network node.

Aspect 17: The method of Aspect 16, wherein receiving the one or more categories includes receiving the one or more categories from the UAV.

Aspect 18: The method of any of Aspects 16-17, wherein receiving the one or more categories includes receiving the one or more categories from an access and mobility management function (AMF) of the network.

Aspect 19: The method of Aspect 18, wherein receiving the one or more categories includes receiving the one or more categories from a UAV service supplier via the AMF of the network.

Aspect 20: The method of any of Aspects 18-19, wherein receiving the one or more categories includes receiving the one or more categories from at least one of a session management function (SMF) or a network exposure function (NEF) of the network via the AMF of the network.

Aspect 21: The method of any of Aspects 18-20, wherein receiving the one or more categories includes receiving the one or more categories retrieved by the AMF of the network from a storage.

Aspect 22: The method of any of Aspects 18-21, wherein the one or more categories are one or more first categories, the method further comprising: receiving one or more second categories from the UAV; and prioritizing the one or more first categories from the AMF of the network over the one or more second categories from the UAV.

Aspect 23: The method of any of Aspects 16-22, wherein receiving the one or more categories includes receiving a Quality of Service (QoS) indicator associated with the one or more categories.

Aspect 24: The method of any of Aspects 16-23, further comprising: determining a measure of Quality of Service (QoS) based at least in part on the one or more categories, wherein the prioritizing is based at least in part on the measure of QoS.

Aspect 25: The method of any of Aspects 16-24, wherein at least one of the network or the network node provides service to the UAV during flight of the UAV.

Aspect 26: The method of any of Aspects 16-25, wherein the one or more categories are associated with a characteristic of at least one of the UAV or a flight of the UAV.

Aspect 27: A method of wireless communication performed by a network device, comprising: receiving one or more categories associated with an unmanned aerial vehicle (UAV); and transmitting the one or more categories to one or more network nodes in communication with the UAV.

Aspect 28: The method of Aspect 27, wherein receiving the one or more categories associated with the UAV includes receiving the one or more categories from the UAV.

Aspect 29: The method of any of Aspects 27-28, wherein receiving the one or more categories associated with the UAV includes receiving the one or more categories from a UAV service supplier.

Aspect 30: The method of any of Aspects 27-29, wherein receiving the one or more categories associated with the UAV includes receiving the one or more categories from a session management function (SMF) or a network exposure function (NEF) associated with the one or more network nodes in communication with the UAV.

Aspect 31: The method of any of Aspects 27-30, further comprising: receiving an indication of an access and mobility management function (AMF) serving the UAV, wherein transmitting the one or more categories to the one or more network nodes in communication with the UAV includes transmitting the one or more categories to the AMF based at least in part on the indication.

Aspect 32: The method of Aspect 31, wherein receiving the indication of the AMF serving the UAV includes receiving the indication from a network exposure function (NEF) associated with the one or more network nodes in communication with the UAV.

Aspect 33: The method of any of Aspects 27-32, wherein transmitting the one or more categories to the one or more network nodes in communication with the UAV includes transmitting the one or more categories to at least one of a session management function (SMF) or a network exposure function (NEF) associated with the one or more network nodes in communication with the UAV.

Aspect 34: The method of any of Aspects 27-33, wherein transmitting the one or more categories to the one or more network nodes in communication with the UAV includes transmitting the one or more categories to a policy control function (PCF) to permit the PCF to determine a quality of service (QoS) indicator based at least in part on the one or more categories and transmit the QoS indicator to at least one of a session management function (SMF) or a network exposure function (NEF) associated with the one or more network nodes in communication with the UAV.

Aspect 35: The method of any of Aspects 27-34, wherein the one or more network nodes provide service to the UAV during flight of the UAV.

Aspect 36: The method of any of Aspects 27-35, wherein the one or more categories are associated with a characteristic of at least one of the UAV or a flight of the UAV.

Aspect 37: An apparatus for wireless communication at a device, comprising a processor; memory coupled with the processor; and instructions stored in the memory and executable by the processor to cause the apparatus to perform the method of one or more Aspects of Aspects 1-15.

Aspect 38: A device for wireless communication, comprising a memory and one or more processors coupled to the memory, the memory and the one or more processors configured to perform the method of one or more Aspects of Aspects 1-15.

Aspect 39: An apparatus for wireless communication, comprising at least one means for performing the method of one or more Aspects of Aspects 1-15.

Aspect 40: A non-transitory computer-readable medium storing code for wireless communication, the code comprising instructions executable by a processor to perform the method of one or more Aspects of Aspects 1-15.

Aspect 41: A non-transitory computer-readable medium storing a set of instructions for wireless communication, the set of instructions comprising one or more instructions that, when executed by one or more processors of a device, cause the device to perform the method of one or more Aspects of Aspects 1-15.

Aspect 42: An apparatus for wireless communication at a device, comprising a processor; memory coupled with the processor; and instructions stored in the memory and executable by the processor to cause the apparatus to perform the method of one or more Aspects of Aspects 16-26.

Aspect 43: A device for wireless communication, comprising a memory and one or more processors coupled to the memory, the memory and the one or more processors configured to perform the method of one or more Aspects of Aspects 16-26.

Aspect 44: An apparatus for wireless communication, comprising at least one means for performing the method of one or more Aspects of Aspects 16-26.

Aspect 45: A non-transitory computer-readable medium storing code for wireless communication, the code comprising instructions executable by a processor to perform the method of one or more Aspects of Aspects 16-26.

Aspect 46: A non-transitory computer-readable medium storing a set of instructions for wireless communication, the set of instructions comprising one or more instructions that, when executed by one or more processors of a device, cause the device to perform the method of one or more Aspects of Aspects 16-26.

Aspect 47: An apparatus for wireless communication at a device, comprising a processor; memory coupled with the processor; and instructions stored in the memory and executable by the processor to cause the apparatus to perform the method of one or more Aspects of Aspects 27-36.

Aspect 48: A device for wireless communication, comprising a memory and one or more processors coupled to the memory, the memory and the one or more processors configured to perform the method of one or more Aspects of Aspects 27-36.

Aspect 49: An apparatus for wireless communication, comprising at least one means for performing the method of one or more Aspects of Aspects 27-36.

Aspect 50: A non-transitory computer-readable medium storing code for wireless communication, the code comprising instructions executable by a processor to perform the method of one or more Aspects of Aspects 27-36.

Aspect 51: A non-transitory computer-readable medium storing a set of instructions for wireless communication, the set of instructions comprising one or more instructions that, when executed by one or more processors of a device, cause the device to perform the method of one or more Aspects of Aspects 27-36.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by an unmanned aerial vehicle (UAV), comprising:

transmitting a communication associated with a registration of the UAV with a mobile network that is to provide a wireless communication service to the UAV during flight of the UAV, wherein the communication includes an indicator that identifies a characteristic of the UAV and triggers the mobile network to obtain a set of initial categories for association with the registration;

providing, by the UAV during the registration to assist in obtaining the wireless communication service from the mobile network, the set of initial categories to at least one of the mobile network or a UAV service supplier, the set of initial categories including:

a mission priority of the UAV associated with life-saving, passenger transport, goods delivery, or surveillance;

a flight control type of the UAV comprising manual control, semi-automatic control, automatic control, semi-autonomous control, or autonomous control;

a flight category of the UAV; and an area of operation category of the UAV comprising a rural area, a suburban area, or an urban area; and obtaining the wireless communication service from the mobile network, for at least a portion of a flight duration of the UAV, to communicate with the mobile network by using a quality of service (QoS) and a traffic priority, each of which is provided by the mobile network based at least in part on the set of initial categories provided by the UAV during the registration.

2. The method of claim 1, wherein the set of initial categories are provided to the UAV service supplier and the UAV service supplier is permitted to supply the set of initial categories to the mobile network.

3. The method of claim 2, wherein the set of initial categories are provided with a communication associated with a registration of the UAV with the UAV service supplier.

4. The method of claim 1, wherein the set of initial categories are provided to the mobile network during the registration.

5. The method of claim 4, wherein the set of initial categories are provided with the communication associated with the registration of the UAV.

6. The method of claim 4, wherein the set of initial categories are provided with a communication associated with a subscription of the UAV to the mobile network.

7. The method of claim 1, further comprising:

transmitting, to a UAV service supplier, a flight plan that includes one or more updated categories that are based at least in part on the flight plan; and receiving, from the UAV service supplier, an approval of the flight plan.

8. The method of claim 7, wherein the flight plan includes the one or more updated categories and is transmitted to the UAV service supplier to permit the UAV service supplier to supply the one or more updated categories to the mobile network.

9. The method of claim 7, further comprising transmitting the one or more updated categories to the mobile network.

10. The method of claim 7, further comprising receiving, from the mobile network, an indicator of an access class that is based at least in part on at least one of the one or more updated categories, the approval of the flight plan, or a combination thereof.

11. The method of claim 10, further comprising obtaining prioritized service from the mobile network using the access class.

12. A method of wireless communication performed by a network node, comprising:

receiving, from at least one of an unmanned aerial vehicle (UAV) or an access and mobility management function (AMF) of a network, a set of categories during a registration of the UAV to assist in obtaining a wireless communication service from the network, the set of categories including:

a mission priority of the UAV associated with life-saving, passenger transport, goods delivery, or surveillance;

a flight control type of the UAV comprising manual control, semi-automatic control, automatic control, semi-autonomous control, or autonomous control;

a flight category of the UAV; and an area of operation category of the UAV comprising a rural area, a suburban area, or an urban area; and prioritizing, based at least in part on the set of categories from the UAV, one or more resources served by the network that includes the network node and that provides the wireless communication service to the UAV during flight of the UAV;

providing a quality of service (QoS) and a traffic priority for the UAV, each of which is based at least in part on prioritizing the one or more resources; and communicating with the UAV, for at least a portion of a flight duration of the UAV, using the QoS and the traffic priority.

13. The method of claim 12, wherein the set of categories are received, via the AMF of the network, from at least one of a UAV service supplier, a session management function (SMF), or a network exposure function (NEF).

14. The method of claim 12, wherein receiving the set of categories includes receiving the set of categories retrieved by the AMF of the network from storage.

15. The method of claim 12, wherein the set of categories are a set of first categories, and wherein the method further comprises:

receiving one or more second categories from the UAV; and prioritizing the set of first categories from the AMF of the network over the one or more second categories from the UAV.

16. The method of claim 12, wherein receiving the set of categories includes receiving a QoS indicator associated with the set of categories.

17. The method of claim 12, further comprising determining a measure of the QoS based at least in part on the set of categories, wherein the prioritizing is based at least in part on the measure of the QoS.

18. A method of wireless communication performed by a network device, comprising:

receiving, from at least one of an unmanned aerial vehicle (UAV) to assist the UAV in obtaining a wireless communication service from a mobile network associated with the network device, a UAV service supplier, a session management function (SMF) associated with one or more network nodes in communication with the UAV, an access and mobility management function (AMF) serving the UAV, or a network exposure function (NEF) associated with the one or more network nodes in communication with the UAV, a set of categories during a registration of the UAV, the set of categories including:

a mission priority of the UAV associated with life-saving, passenger transport, goods delivery, or surveillance;

a flight control type of the UAV comprising manual control, semi-automatic control, automatic control, semi-autonomous control, or autonomous control;

a flight category of the UAV; and an area of operation category of the UAV comprising a rural area, a suburban area, or an urban area; and transmitting the set of categories to the one or more network nodes in communication with the UAV that provide the wireless communication service to the UAV during flight of the UAV; and providing the wireless communication service to the UAV, for at least a portion of a flight duration of the UAV, using a quality of service (QoS) and a traffic priority that are provided by the mobile network based at least in part on the received set of categories.

19. The method of claim 18, further comprising receiving an indication of the AMF serving the UAV, wherein the set of categories are transmitted to the AMF based at least in part on the indication.

20. The method of claim 19, wherein the indication of the AMF serving the UAV is received from the NEF associated with the one or more network nodes in communication with the UAV.

21. The method of claim 18, wherein the set of categories are transmitted to at least one of the SMF or the NEF associated with the one or more network nodes in communication with the UAV.

22. The method of claim 18, wherein the set of categories are transmitted to a policy control function (PCF) to permit the PCF to determine a QoS indicator based at least in part on the set of categories and transmit the QoS indicator to at least one of the SMF or the NEF associated with the one or more network nodes in communication with the UAV.

23. An unmanned aerial vehicle (UAV) for wireless communication, comprising:

one or more processors, in communication with one or more memories, the one or more processors configured individually or in any combination to:

transmit a communication associated with a registration of the UAV with a mobile network that is to provide a wireless communication service to the UAV during flight of the UAV, wherein the communication includes an indicator that identifies a characteristic of the UAV and triggers the mobile network to obtain a set of initial categories for association with the registration;

provide, by the UAV during the registration to assist in obtaining the wireless communication service from the mobile network, the set of initial categories to at least one of the mobile network or a UAV service supplier, the set of initial categories including:

a mission priority of the UAV associated with life-saving, passenger transport, goods delivery, or surveillance;

a flight control type of the UAV comprising manual control, semi-automatic control, automatic control, semi-autonomous control, or autonomous control;

a flight category of the UAV; and an area of operation category of the UAV comprising a rural area, a suburban area, or an urban area; and obtain the wireless communication service from the mobile network, for at least a portion of a flight duration of the UAV, to communicate with the mobile network by using a quality of service (QoS) and a traffic priority, each of which is provided by the mobile network based at least in part on the set of initial categories provided by the UAV during the registration.

24. The UAV of claim 23, wherein the one or more processors are further configured individually or in any combination to:

transmit, to a UAV service supplier, a flight plan that includes one or more updated categories that are based at least in part on the flight plan; and receive, from the UAV service supplier, an approval of the flight plan.

25. The UAV of claim 24, wherein the one or more processors are further configured individually or in any combination to receive, from the mobile network, an indicator of an access class that is based at least in part on at least one of the one or more updated categories, the approval of the flight plan, or a combination thereof.

26. The UAV of claim 25, wherein the one or more processors are further configured individually or in any combination to obtain prioritized service from the mobile network using the access class.

27. The UAV of claim 23, wherein the one or more processors are configured individually or in any combination to provide the set of initial categories to the UAV service supplier to permit the UAV service supplier to supply the set of initial categories to the mobile network.

28. The UAV of claim 27, wherein the one or more processors are configured individually or in any combination to provide the set of initial categories with a communication associated with a registration of the UAV with the UAV service supplier.

* * * * *